US012654226B2

(12) United States Patent
Holfelder-Schwalme

(10) Patent No.: US 12,654,226 B2
(45) Date of Patent: Jun. 16, 2026

(54) METHOD AND DEVICE FOR GENERATING CONTROL DATA FOR AN ADDITIVE MANUFACTURING DEVICE

(71) Applicant: EOS GMBH ELECTRO OPTICAL SYSTEMS, Krailling (DE)

(72) Inventor: Peter Holfelder-Schwalme, Saal an der Donau (DE)

(73) Assignee: EOS GMBH ELECTRO OPTICAL SYSTEMS, Krailling (DE)

( * ) Notice: Subject to any disclaimer, the term of this patent is extended or adjusted under 35 U.S.C. 154(b) by 694 days.

(21) Appl. No.: 18/018,229

(22) PCT Filed: Aug. 2, 2021

(86) PCT No.: PCT/EP2021/071589
§ 371 (c)(1),
(2) Date: Jan. 26, 2023

(87) PCT Pub. No.: WO2022/033913
PCT Pub. Date: Feb. 17, 2022

(65) Prior Publication Data
US 2023/0286053 A1 Sep. 14, 2023

(30) Foreign Application Priority Data
Aug. 11, 2020 (DE) .......................... 102020121144.9

(51) Int. Cl.
*B22F 10/85* (2021.01)
*B22F 10/28* (2021.01)
(Continued)

(52) U.S. Cl.
CPC .............. *B22F 10/85* (2021.01); *B22F 10/28* (2021.01); *B22F 10/366* (2021.01); *B22F 12/10* (2021.01);
(Continued)

(58) Field of Classification Search
CPC ........ B22F 10/85; B22F 10/28; B22F 10/366; B22F 12/10; B22F 12/90; B22F 2998/10;
(Continued)

(56) References Cited

U.S. PATENT DOCUMENTS

| 5,182,055 A | 1/1993 | Allison et al. |
| 2015/0209910 A1* | 7/2015 | Denney ................ B23K 26/342 |
| | | 219/76.1 |

(Continued)

FOREIGN PATENT DOCUMENTS

| DE | 102015222083 | 5/2017 |
| DE | 102018110294 | 10/2019 |

(Continued)

OTHER PUBLICATIONS

German Search Report for Application No. DE 102020116030.5, dated Jan. 14, 2021, 7 pages.

(Continued)

*Primary Examiner* — Michael J Brown
(74) *Attorney, Agent, or Firm* — Polsinelli PC

(57) ABSTRACT

The invention relates to a method for generating control data for a device for additively manufacturing a component in a manufacturing process, in which method the energy beam is moved along a number of solidification paths across the construction field, and operation takes place at least temporarily in a toothing mode in which, when the energy beam is being moved across the construction field, a location-dependent desired welding-in depth of the energy beam is switched over at a plurality of switchover points which are randomly distributed over at least one defined region of a cross-section of the component in the layer in question.

15 Claims, 9 Drawing Sheets

(51) Int. Cl.

| | |
|---|---|
| *B22F 10/366* | (2021.01) |
| *B22F 12/10* | (2021.01) |
| *B22F 12/90* | (2021.01) |
| *B33Y 10/00* | (2015.01) |
| *B33Y 30/00* | (2015.01) |
| *B33Y 40/00* | (2020.01) |
| *B33Y 50/02* | (2015.01) |
| *B29C 64/153* | (2017.01) |

(52) U.S. Cl.
CPC .............. *B22F 12/90* (2021.01); *B33Y 10/00* (2014.12); *B33Y 30/00* (2014.12); *B33Y 40/00* (2014.12); *B33Y 50/02* (2014.12); *B22F 2998/10* (2013.01)

(58) Field of Classification Search
CPC .......... B22F 10/36; B22F 10/38; B33Y 10/00; B33Y 30/00; B33Y 40/00; B33Y 50/02; Y02P 10/25; B29C 64/153; B29C 64/386; G05B 19/4099
USPC ........................................................ 700/119
See application file for complete search history.

(56) References Cited

U.S. PATENT DOCUMENTS

| | | | |
|---|---|---|---|
| 2018/0326536 A1 | 11/2018 | Mentzel et al. |
| 2021/0245251 A1 | 8/2021 | Mattes et al. |
| 2021/0354372 A1 | 11/2021 | Krol et al. |
| 2021/0387284 A1 | 12/2021 | Holfelder et al. |
| 2022/0008996 A1 | 1/2022 | Holfelder |

FOREIGN PATENT DOCUMENTS

| | | |
|---|---|---|
| DE | 102018125731 | 4/2020 |
| DE | 102018128265 | 5/2020 |
| DE | 102018128266 | 5/2020 |
| EP | 3482853 | 5/2019 |

OTHER PUBLICATIONS

International Search Report Application No. PCT/EP2021/064881, dated Aug. 10, 2021, 5 pages.

* cited by examiner

FIG 9

METHOD AND DEVICE FOR GENERATING CONTROL DATA FOR AN ADDITIVE MANUFACTURING DEVICE

TECHNICAL FIELD OF THE INVENTION

The invention relates to a method for generating control data for a device for additively manufacturing a component in a manufacturing process, in which method construction material, preferably comprising a metal powder, is built up in layers in a construction field, and in each case a selective solidification of construction material takes place between the application of two material layers of construction material whereby the construction material is exposed to at least one energy beam. The invention further relates to a method for additive manufacture of a component, wherein construction material, preferably comprising a metal powder, is built up in layers in a construction field and in each case a selective solidification of construction material is accomplished between the application of two material layers of construction material by irradiation of the construction material by at least one energy beam. In addition, the invention relates to a corresponding control data generating device for generating control data, a control device for a device for additive manufacture and a corresponding device for additive manufacturing of a component which is fitted with such a control device.

BACKGROUND OF THE INVENTION

Additive manufacturing processes are becoming more and more relevant in the production of prototypes and now also in series manufacture. In general, "additive manufacturing processes" are to be understood as those processes in which a manufacturing product (hereinafter also called "component") is usually built up on the basis of digital 3D construction data through the deposition of material (the "construction material). The construction usually but not necessarily takes place in layers. The term "3D printing" is frequently used as a synonym for additive manufacturing, the production of models, patterns and prototypes using additive manufacturing processes is frequently designated as "rapid prototyping", the production of tools as "rapid tooling" and the flexible production of series components is designated as "rapid manufacturing". As mentioned initially, a core point is the selective solidification of the construction material, wherein in many manufacturing processes this solidification can take place with the aid of an exposure to radiation energy, e.g. electromagnetic radiation, in particular light and/or thermal radiation but optionally using particle radiation such as electron radiation. Examples for methods operating with irradiation are "selective laser sintering" or "selective laser fusion". In this case, thin layers of a usually powdery construction material are applied one above the other and in each layer the construction material is selectively solidified in a "welding process" by spatially delimited irradiation of the location which should pertain to the component to be manufactured after fabrication in a "welding process", whereby the powder grains of the construction material are partially or completely fused with the aid of energy introduced locally by the radiation at this location. After a cooling, these powder grains are then solidified together to form a solid. Usually in this case, the energy beam is guided along solidification paths across the construction field and the melting or solidification of the material in the respective layer accordingly takes place in the form of "welding paths" or "welding beads" so that ultimately a plurality of such layers formed from welding paths is present in the component.

In this way components having very high quality and breaking strength can now be produced. Nevertheless, depending on the material, construction method and stressing of the component—as in the case of every component—breaks can naturally also occur.

SUMMARY OF THE INVENTION

It is the object of the present invention to provide methods for generating control data or for additive manufacture of a component and suitable devices for this in order to be able to manufacture components having increased breaking strength, preferably in a selective laser sintering process as was mentioned initially.

In the method according to the invention for generating control data, as already mentioned initially, control data are generated for a device for additive manufacture of a component in a manufacturing process. In this manufacturing process construction material is built up in layers, i.e. successively in a plurality of material application planes or material layers. The construction material preferably comprises a metal powder. However, the invention is not restricted to this but can also be used with other, preferably powdery construction materials such as plastics or ceramic or mixtures of different materials. In this case, construction material is selectively solidified between the application of two material layers by irradiating the construction material using at least one energy beam produced by an irradiation unit of the manufacturing device. In this case, not only the construction material in the uppermost freshly applied material layer is covered by the energy beam and fused or re-melted but the energy beam usually penetrates a bit deeper into the material bed and also reaches material located thereunder which has already been re-melted from previously applied material layers.

The control data are created in such a manner that the manufacturing device is controlled so that the energy beam or an impact surface of the energy beam, as mentioned initially, is moved along a plurality of solidification paths across the construction field. "Moving" can be understood to mean here the usual deflection of the energy beam bundle, e.g. by galvanometer mirrors but also a displacement of the complete beam delivery unit e.g. in the form of a diode bank, in particular laser diode bank or by a moving beam formation of the irradiation unit. As a result of the energy introduced by the energy beam along these solidification paths, construction material is re-melted in each case in a region of the impact surface and around the impact surface of the energy beam on the construction field since the total energy input here is sufficiently high in each case. The energy beam can be displaced in this case over the cross-section of the component in the respective layer along a single cohesive solidification path (scan track). Usually however, short solidification paths running next to one another are travelled by the energy beam. e.g. so-called hatches which run transversely to an irradiation strip or in an irradiation field (for example, a field in a chessboard pattern), i.e. the entire area to be solidified is divided virtually into irradiation strips or irradiation fields which in turn are composed of the hatches which are then travelled by the energy beam according to a predefined scan strategy.

In this case, the manufacturing operation (i.e. the operation of the manufacturing device, in particular of the laser beam) takes place at least temporarily in an "interlocking mode" according to the invention. "At least temporarily" means that the interlocking mode is possibly only used in certain sections/segments of the component e.g. inside the component. Fundamentally however the interlocking mode could also be used during the entire production process. This interlocking mode is configured in such a manner that, when the energy beam is moved across the construction field, a location-dependent target welding penetration depth of the energy beam is intentionally switched at a plurality of switching points.

As mentioned above, not only the construction material covered by the energy beam in the uppermost freshly applied material layer is fused or re-melted but the energy beam passes through the material bed and also reaches material located thereunder from previously applied material layers. The depth of the weld seam which is measured after solidification of the layer from the newly created surface (i.e. the upwardly pointing solidified cross-sectional surface of the component in the z direction in the powder bed method; this surface therefore differs from the working plane or coater plane in that the working plane lies higher than the solidified cross-sectional surface of the component by a currently non-solidified powder layer), is designated as "welding penetration depth" or "solidification track depth". This "welding penetration depth" or "solidification track depth" fluctuates depending on the process but to some extent unintentionally with time, which will be explained in greater detail hereinafter. The desired average depth of action of the energy beam which is provided at the respective location (x, y) in the construction plane is designated within the framework of the invention as "target welding penetration depth" (synonymous with "average target welding penetration depth". This is the welding penetration depth or depth setting at which the control of the manufacturing device is actually aimed and about which the actual (actual) welding penetration depth fluctuates to some extent.

At this point it is pointed out that when a laser beam is used as energy beam within the framework of the method according to the invention, a continuous wave (cw) laser is preferably used. Fundamentally however, a pulsed laser or a pulse-modulated laser (modulation can be accomplished, for example with an EOM-electro-optic modulator or AOM-acousto-optic modulator). Also when a pulsed or pulse-modulated laser is used, its impact surface in the sense of the invention is moved along the solidification path even if the beam power is briefly interrupted in the course of the pulsing. The pulse frequency is usually selected to be so high that the welding penetration depth is not substantially influenced here, i.e. a continuous weld bead with a constant welding penetration depth within the framework of the usual process fluctuations is still formed.

The target welding penetration depth can be designated as or deemed to be location-dependent since different target welding penetration depths can be predefined depending on the location in the component or along a solidification path. This procedure can be required during a processing in the so-called "downskin mode", i.e., in particular during processing in the overhang. For example, in the "downskin mode" it can be appropriate to set the target welding penetration depth initially only to one or two layers instead of at least two to three layers in order not to penetrate the overhang downwards. Furthermore, for example, in a hatch strategy, as has already been mentioned above, it is possible to travel into the individual hatches with run-in ramps or with run-out ramps in each case (so-called "fade-in" and "fade-out"). That is, the target welding penetration depth is initially (relatively slowly) continuously increased at the beginning of a hatch and reduced correspondingly slowly at the end when travelling out. These ramps are a possible means for reducing any material rejection (called "splash" in the selective laser melting of metal) at the beginning of a hatch and a means for reducing porosity which can occur, for example, at the end of a hatch.

Within the framework of the invention, i.e. within the framework of the interlocking mode used according to the invention, this target welding penetration depth (or "average" depth of action) of the energy beam is in each case specifically or intentionally actively switched at the said switching points, i.e. newly predefined. The switching or the new setting of the target welding penetration depth is preferably accomplished relatively abruptly within the framework of a stable process window, particularly preferably only over one or a few (e.g. two to three) "microvectors". The microvectors comprise smallest possible switching steps of the controller for the irradiation components or the irradiation unit which, for example can be 10 µs, 50 µs or 100 µs (clock frequency). In contrast to this, the fade-in and fade-out processes already mentioned above in a hatch run more slowly or continuously in a ramp-like manner over a longer distance since a power of the energy beam is gradually increased there over many microvectors e.g. 5, 10, 50 or 100 microvectors. Likewise the already mentioned unintentional fluctuation of the solidification track depth behaves considerably more slowly than the mentioned intentional switching of the target welding penetration depth. Furthermore, the intentional switching of the target welding penetration depth within the framework of the interlocking mode preferably extends over several material layers, as will be explained hereinafter, i.e. the "amplitude" of the intentionally produced welding penetration depth change is stronger than the unintentional "natural" fluctuations.

According to the invention, the switching points in the interlocking mode according to the invention are randomly or statistically distributed using a predefined probability distribution (or a random distribution for a point process) over at least one defined region of a cross-section of the component in the respective layer. A Poisson distribution is quite particularly preferably used here. The random or statistical distribution can be accomplished using a random value additionally generated intentionally for this which can be generated according to the desired distribution. "Randomly" should be understood in this context as not only truly random but also as "quasi-random" or "pseudo-random" if the desired distribution can be imaged sufficiently well with this, i.e. the random value can be a genuine random number or pseudo-random number.

The control data generated in this way are then used to control the manufacturing device so that the solidification of the construction material then takes place. With the aid of the method according to the invention it is thereby possible to control the manufacturing process, in particular a selective laser sintering process so that the problems mentioned initially, in particular the occurrence of fatigue breaks can be reduced or even completely avoided under some stresses.

The procedure according to the invention is based on the observation by means of complex investigations that when they break, additively manufactured components break presumably preferably at the weld seams between the layers. If it is assumed to a good approximation that when manufactured in the hitherto usual manner, the weld seams between the weld beads of two layers arranged one above the other lie approximately in one plane, a crack once formed can propagate more easily along this plane which can then lead to a rupture of the component.

As a result of the randomly controlled variation of the weld seams in the interlocking mode—i.e. the relatively rapid significant "jumps"-in the depth direction, it is now advantageously achieved that a crack formed, for example, due to overloading or ageing of the material comes across an "obstacle" in the course of its propagation and must make a diversion at this point. As a result, energy is dissipated during the propagation process and braking occurs. In addition, as a result of this diversion the crack tip is turned from the opening stress state and the crack-opening force component decreases. In other words, "the crack rapidly runs dead" so that any crack propagation in one and the same layer is prevented. That is, during a multiple variation of the location-dependent target welding penetration depth and therefore the average depth of action of the energy beam during the path of the energy beam along the solidification path whilst producing a random pattern according to the predefined probability distribution or probability function, it is achieved in the "interlocking mode" that the "boundary surfaces" between the "layers" are better "interlocked" in the interior and thus can suppress or even completely stop the crack propagation.

It is pointed out once again that this interlocking mode can be used in the entire component but need not necessarily be used. As will be explained in greater detail subsequently, it can, for example, be appropriate to exclude individual regions or segments from the interlocking or to reduce the number of switching points there. Instead of a homogeneous point process or a homogeneous probability distribution, for example an inhomogeneous point process or an inhomogeneous probability distribution can also be used. For example, the density or the intensity of the switching points can be a function of the distance from the nearest component edge, as will be explained in greater detail hereinafter.

In principle, the switching points can be specified online, i.e. directly during the actual processing process, i.e. in real time or in almost real time. In this case, for example certain pre-control data can be used which predefine a (location-dependent) target welding penetration depth "normally" (within the invention) provided for the respective location along a solidification path which is then subsequently processed in the online control data stream, wherein the desired switching points or "jumps" in the depth direction are incorporated. To this end, for example, the microvectors with the control data for the first target welding penetration depth actually provided at the respective location can be simply replaced by microvectors with the control data for a suitable second target welding penetration depth. By means of the probability distribution, for example, time intervals can be specified after which a switching to the changed target welding penetration depth is performed in each case.

However, the switching points can also be specified offline or in advance, i.e. before the actual processing process, i.e. the process of generating the random pattern of switching points can fundamentally also be shifted before the construction process. In this case, a type of "switching map" or "welding-depth-map" can then be produced, on which the positions of the switching points and therefore also the spatial distances between the switching points can then be defined. In this switching map the switching points in the surface can then be arranged statistically. This switching map can then be used as a template subsequently when the energy beam travels its solidification path for processing the component, i.e. the control data can comprise such a "welding-depth-map" which will be explained in detail hereinafter.

In a method according to the invention for controlling a manufacturing device for additively manufacturing a component, firstly control data are generated in the manner according to the invention and these are then used to control the device with the control data. In this case, as mentioned, the control data can be generated in advance and transmitted as a complete package or a type of "control protocol" to the device which then performs the production process. In principle however, it would also be possible to determine control data during the process already running for subsequent processes, for example, whilst a layer is solidified, to determine the control data for the next layer and use it during solidification of the further layer.

The starting basis for the control data are inter alia data which specify at which points within the process chamber or the construction field material is to be solidified, i.e. which parts should subsequently pertain to the component or to possible support structures or the like and which regions do not. These data can be deduced, for example, from a digital 3D model of the object to be fabricated and/or the support structures. If these data and further required information are provided, such as for example, which material is used, which solidification device, in particular which type of energy beam is available or within the framework of which parameters this can be set etc., the data for a randomly controlled variation of the weld seams in the depth direction and be determined using the method described above and the control data can be suitably modified or determined.

The control data can accordingly preferably comprise exposure control data such as, for example, scan data which defined or specify the movement of the energy beam on the surface, control data for setting the magnitude of the energy or laser intensity, control data relating to the "form" of the beam or the beam profile and/or the focus or the extension of the beam perpendicular to the beam direction. Furthermore, however, the control data—as will be explained subsequently—can also comprise other control information such as coating control data which predefine how thick an actual layer is, information relating to the control or pre- or after-heating using different energy input means, relating to the injection of protective gas etc. All these parameters can optionally influence the welding penetration depth and therefore be used for control of the same, as will be explained hereinafter.

Merely for the sake of completeness it should be mentioned once again at this point that the energy beam can comprise both particle radiation and also electromagnetic radiation such as light or preferably laser radiation.

It is also pointed out that a plurality of energy beams can be used in a coordinated manner and specifically parallel at various points of the component cross-section (e.g. for increasing the building speed) and also combined at one point, as will be explained hereinafter for an example. Accordingly the control data must be coordinated so that a plurality of energy beams can be controlled in a coordinated manner.

It should also be mentioned at this point that the control data can be used on the one hand for a "simple" control of the process but also for regulation of the process, for example, whereby the control data predefine target data for a more extensive regulation of the process.

In other words, with the aid of the method according to the invention, the required quantities can be derived for a regulator which, for example, receives actual data for feedback, which are determined by a melt pool monitoring or a time-resolved optical tomography.

Other more complex adaptations can also be carried out. On this matter, a probability dimension can be defined which is adapted again depending on the distance from a location of an indication of the preceding layers detected by a monitoring system.

In the method according to the invention for the additive manufacture of a component in a construction field, construction material, preferably comprising a metal powder, is built up in layers and a selective solidification of construction material is accomplished between the application of two material layers of construction material whereby the construction material is irradiated with at least one energy beam. In this case, as mentioned, the energy beam is moved along a plurality of solidification paths across the construction field and in this case, operation takes place at least temporarily in an interlocking mode in which a location-dependent target welding penetration depth of the energy beam is changed at a plurality of switching points. The switching points are distributed randomly using a predefined probability distribution over at least a defined region of a cross-section of the component in the respective layer. Preferably a homogeneous probability distribution can be used. However, inhomogeneous probability distributions can also be used if this is desired.

In a preferred variant, a Poisson distribution is used in such a manner that the local distribution of the switching points on the solidification paths within the framework of the spatial statistics corresponds to the result of the Poisson point process. In this case therefore, the device can be controlled using control data which were created according to the method according to the invention for generating control data.

As mentioned, the probability distribution can be related to a temporal or a spatial specification of a change of the target welding penetration depth. A temporal specification can in particular be accomplished during a generation of control data performed in real time whereas a spatial specification can be performed, for example, in particular with control data specified in advance. The method according to the invention for the additive manufacture of a component shares the advantages of the method according to the invention for generating control data.

A control data generating device according to the invention for generating control data for a device for the additive manufacture of a component in a manufacturing process in which, in a construction field, construction material, preferably comprising a metal powder, is built up in layers and in each case, a selective solidification of construction material is accomplished between the application of two material layers of construction material whereby the construction material is irradiated with at least one energy beam from an irradiation device, is configured so that control data are created by means of which the additive manufacturing device can be controlled using the control data so that the energy beam is moved along a plurality of solidification paths across the construction field and in this case, operation takes place at least temporarily in an interlocking mode. The interlocking mode is configured, as stated, in such a manner that during movement of the energy beam across the construction field, a location-dependent target welding penetration depth is changed at a plurality of switching points which are randomly distributed using a predefined probability distribution, preferably a homogeneous distribution, particularly preferably a Poisson distribution, over at least one defined region of a cross-section of the component in the respective layer. The specification of the switching points can be distributed over a time scale and/or accomplished in a spatially distributed manner so that control data are created by means of which the additive manufacturing device can be controlled accordingly according to the invention using these control data.

The control data generating device share the advantages of the method according to the invention for generating control data.

The control data generating device can, for example, be part of a control device of a manufacturing device for the additive manufacture of components. However, it can also be implemented independently on another computer in order to then transfer the data to the control device.

Accordingly a control device according to the invention for such a device for additive manufacture of a manufacturing process comprises a control data generating device according to the invention and/or an interface to such a control data generating device for provision of the relevant control data or to receive the control data from the control data generating device and in order to control the manufacturing device, in particular for irradiation of the construction material with the energy beam, using these control data.

The control device according to the invention shares the advantages of the method according to the invention for control of a manufacturing device for the additive manufacture of components.

A device according to the invention (manufacturing device) for the additive manufacture of components in an additive manufacturing process comprises, in addition to the usual components such as a feed device for introducing construction material—for example, in the form of a layer of construction material—in a process chamber and an irradiation device for selective solidification of the construction material by irradiation by means of an energy beam, at least one such control device.

It should be pointed out at this point that the device according to the invention can also comprise a plurality of irradiation devices which are then controlled, as mentioned above, suitably coordinated with the control data. It should also be mentioned once again that in this respect the energy beam can also consist of a plurality of superimposed energy beams.

The device according to the invention for the additive manufacture of components shares the advantages of the method according to the invention for the additive manufacture of a component.

The control data generating device according to the invention can in particular be implemented in the form of a computer unit with suitable software. The computer unit can, for example comprise one or more cooperating microprocessors or the like for this purpose. In particular, it can be implemented in the form of suitable software program parts in the computer unit of a control data generating device or control device. A largely software implementation has the advantage that computer units already used previously, in particular control data generating device and control devices of manufacturing devices can be retrofitted in a simple manner by a software or firmware update in order to operate in the manner according to the invention. In this respect, the object is also achieved by a corresponding computer program product with a computer program which can be loaded directly into a storage device of a computer unit, in particular a control data generating device and/or control device, with program sections in order to implement all the steps of the method according to the invention when the program is executed in the computer unit or control data generating device and/or control device. In addition to the computer program, such a computer program product can optionally additionally comprise components such as a documentation and/or additional components, also hardware components such as hardware keys (dongles etc.) for use of the software. A computer-readable medium, for example, a memory stick, a hard disk or such a transportable or firmly installed data carrier on which are stored the program sections of the computer program which can be read in and executed by a computer unit, in particular the control data generating device and/or the control unit, can be used for transport to the computer unit or control data generating device and/or control device and/or for storage on or in the computer unit or control data generating device and/or control device.

Further particularly advantages embodiments and further developments of the invention are obtained from the dependent claims and the following description, wherein the independent claims of one claim category can also be further developed similarly to the dependent claims and exemplary embodiments of another claim category and in particular, individual features of various exemplary embodiments or variants can be combined to form new exemplary embodiments or variants.

As mentioned, there are various process parameters by means of which, since they inter alia also determine the local energy input, the welding penetration depth can be influenced and by means of which the target welding penetration depth can be changed at a switching point. In this case, the welding region can also be varied in order to influence the energy beam power, i.e. for example, a change can be made between deep welding and heat-conduction welding, as will be explained hereinafter.

Preferably, for a change of the target welding penetration depth at least one of the following parameters is specifically or intentionally varied:

the energy beam power;

the intensity distribution in the energy beam, the focus setting, the scan speed, the local supply of a gas or a gas mixture to the construction field.

The energy beam power can be varied relatively rapidly and simply in a conventional manner, e.g. by setting the laser power when a laser beam is used as energy beam. This parameter can therefore preferably be used.

There are various possibilities for varying the intensity distribution in the energy beam. In practical application or in the hitherto known machines or devices for additive manufacture, energy beams having a (circular symmetrical) Gaussian profile are usually used. That is, the intensity is highest at the centre of the energy beam and weakens in all directions radially outwards transversely to the propagation direction or current beam path direction (also called for short "beam direction" or "beam axis") of the energy beam according to a Gaussian curve. Such a Gaussian profile can be obtained without further measures from the energy beam sources used hitherto, for example, a customary laser. The intensity profile can also be modified by suitable beam modulators, wherein an example for this is given subsequently. The intensity distribution in the energy beam can also be influenced, for example, by the superposition of a plurality of energy beams.

The "intensity profile" is in this case more appropriately defined in an imaginary plane perpendicular to the direction of incidence (i.e. the beam direction) shortly before the impact surface. In most situations, this defined intensity profile does not correspond to the intensity profile directly on the surface of the construction field or in the working plane since the energy beams is usually obliquely incident on the construction field. However, this does not exclude the fact that the respective oblique position is also taken into account with the framework of a setting of a suitable intensity profile.

The focal setting is closely related to the setting of the intensity profile or can also be seen as a subcase thereof. The change of the focal setting (i.e. the setting of the focal position) results in a variation of the energy beam extension at the impact surface whereby, inter alia, a diameter of the energy beam on the construction field is varied.

The scan speed also influences the local energy input (at the respectively current position) since a low scan speed means that the energy beam takes longer to cover a location with the result that if the beam power of the energy beam itself remains the same, the energy input is increased and an increased scan speed results conversely in a reduced energy input. If the radiation unit, for example, comprises a so-called galvanometer scanner, the scan speed can be simply controlled by this means. Just as simply, it would also be possible to control the travel speed of a movable line of exposure units of the irradiation device.

The welding penetration depth can also be influenced by the local supply of a gas or a gas mixture which has a different chemical composition compared to the general process gas. A "local" supply of a gas or a gas mixture to the construction field should be understood so that this special gas or the gas mixture is only supplied in a predefined partial region of a cross-section of the component currently to be solidified, e.g. in a region around the impact surface of the energy beam on the construction plane whereas otherwise, the process chamber is filled with a different process gas. For example, a movable gas nozzle with a flexible supply hose can be arranged in the process chamber through which helium or a helium-argon gas mixture is supplied locally to a certain partial area of the component cross-section which is just being solidified.

Particularly preferably, the depth setting or the change in the target welding penetration depth can be accomplished by a selection from a plurality of process parameters adapted to a specific manufacturing process so that despite the variation of the individual parameters for varying the target welding penetration depth, the desired specific properties of a component can be achieved.

There are various possibilities for the precise switching strategy in the interlocking mode, i.e. which target welding penetration depths are used and how switching takes place between different target welding penetration depths. In this case, the optimal strategy can also be dependent on the specific formulation of the object, e.g. the type of component and the requirements for the component.

In a preferred variant at a switching point a switching is specifically made in each case between at least two different, previously defined, location-dependent target welding penetration depths. This results in a relatively uniform interlocking in relation to the change in depth. The at least two target welding penetration depths preferably comprise at least one (usually less deep) standard target welding penetration depth and a (preferably deeper) special target welding penetration depth.

The choice of the standard target welding penetration depth can, for example, be dependent on the type of material and the requirements on the strength of the component. The deeper special target welding penetration depth can, for example, be determined by the geometry or dimensions of the component and strength requirements. Advantageously therefore the selection of the location-dependent target welding penetration depth can be adapted to the respective local conditions in a component and to its dimensions so that in particular, strength properties of the component are not adversely affected by the change of the target welding penetration depth. For example, in regions with small thicknesses it is more appropriate to select a smaller special target welding penetration depth than in regions in which the thickness is not a limiting factor for the welding penetration depth. Small thicknesses occur, for example, when processing components in the down skin mode (i.e. in the lowest component layers or in an overhang region) in which the target welding penetration depth is therefore reduced.

In another preferred variant which can be used within a complete construction process alternatively or combined with the first-mentioned variant, at a switching point a new location-dependent target welding penetration depth is selected depending on a random number generated according to a predefined (second) probability distribution. This random number can again be truly random or quasi-random or pseudo-random. In this procedure, therefore the target welding penetration depth is random within certain limits.

After a switching from a first location-dependent target welding penetration depth to a second location-dependent target welding penetration depth (e.g. from the less deep location-dependent "standard target welding penetration depth" to the deeper "special target welding penetration depth") at a first switching point in the further course along the solidification path a switching back to the first location-dependent target welding penetration depth or a switching to another location-dependent target welding penetration depth can take place according to one of the following strategies: On the one hand, the change of the welding penetration depth can take place in each case after a predefined defined time interval and/or after a defined further path distance. In this case, it should be noted that if the scan speed is known, a specification of a defined time interval corresponds to a defined further path distance. The defined path distance can in this case preferably be at least 30 μm, particularly preferably at least 50 μm. On the other hand, the defined path distance is preferably at most 300 μm, further preferably at most 200 μm, further preferably at most 150 μm, further preferably at most 100 μm, further preferably at most 80 μm, particularly preferably at most 60 μm.

On the other hand, a change can also take place at a subsequent second switching point along the path distance, i.e. ultimately depending on a following random number generated according to a probability distribution.

It is pointed out that with the same number of statistically distributed switching points, the frequency of the switchings overall is twice as high in the first variant as in the second variant since in the first variant two switchings (e.g. forward and back switching) always take place at a fixed (time and/or spatial) distance from one another per statistically arranged switching point.

Regardless of the selected variant of these back-switching or switching strategies, however an "average welding penetration depth switching frequency" is advantageously at least higher than an estimated frequency of process-dependent unavoidable, unintentional fluctuations in the actual welding penetration depth to be expected in the manufacturing process, by means of which superposition effects can occur as already mentioned above. The "average welding penetration depth switching frequency" which corresponds to the "intensity" of the statistic process is in this case defined by the number of switching points per path distance or time, i.e. the randomly distributed switching points plus the switch-back points or switching points after the respective time interval or path distance, which are optionally dependent thereon.

The unintentional fluctuations of the actual welding penetration depth are mostly approximately periodic in this case, wherein an oscillation takes place over at least 20 to 40 microvectors, i.e. at a scan speed of 1 m/s at 200 to 400 μm.

A switching between two target welding penetration depths can also take place not only within a single solidification path but also when changing between two indirectly or directly adjacent solidification paths, i.e. during a path change, in particular from one hatch to the next.

Different strategies can be used according to the situation for determining the switching depth, i.e. the depth difference (or the depth disparity) between a second location-dependent target welding penetration depth (to which a switching takes place at the switching point) and the first location-dependent target welding penetration depth (from which switching takes place, e.g. the location-dependent standard target welding penetration depth). The depth difference in this case is a measure which specifies over how many layers or over which depth the one target welding penetration depth extends more than the other.

In a preferred procedure, at least in some regions a depth difference between the second location-dependent target welding penetration depth and the first location-dependent target welding penetration depth is selected independently of the first location-dependent target welding penetration depth actually set at the switching point, i.e. its depth extension. In this method therefore, the depth difference is specified as substantially fixed. In this case, it can, for example, in one hatch be irrelevant whether a change of the target welding penetration depth takes place in a fade-in or fade-out region or in the middle region of the hatch. The fact that the procedure is applied in some regions should again be understood here to mean that this fixed depth difference only applies in certain working regions, i.e. for example in certain segments of the component. The selected depth difference can therefore, for example, be dependent on whether a switching point lies in the overhang region or not.

In a further preferred procedure, the depth difference between the second location-dependent target welding penetration depth and the first location-dependent target welding penetration depth can be selected, at least in some regions, to be proportional to the first location-dependent target welding penetration depth, i.e. its depth extension. In this way, for example, the depth difference in the fade-in region or fade-out region of a hatch is selected to be smaller than in the centre. In these regions, it can possibly be appropriate to reduce the interlocking or in extreme cases, avoid it since the desired effect of a reduction in splash formation and porosity can be weakened or cancelled by an abrupt increase in power. In practice, fade-in regions and fade-out regions have lengths of about 0.1 to 0.5 mm which, depending on the local scan speed can correspond to approximately 5 to 100 microvectors. Likewise it can automatically be ensured that in a downskin region, i.e. in particular in overhang regions in which the first location-dependent target welding penetration depth is significantly smaller, the depth difference is also correspondingly smaller. Since, as stated, a downskin region is a solidification region which lies directly above or in a defined number of layers above a layer of unsolidified powder, higher welding penetration depths or solidification depths there could result in an increased roughness which can be undesirable because it affects the visible underside of a component.

For the definition of the target welding penetration depths (relative to the upwardly pointing solidified cross-sectional area of the component in the powder bed method) and the depth differences, it is possible to use the so-called "nominal layer thickness" of the construction process (processing process). The "nominal layer thickness" comprises the layer thickness by which the component must grow on average after the first run-in process (i.e. after construction of the first layers) in the further processing process.

In a selective laser sintering method, the nominal layer thickness is, for example, generally smaller than the applied material layer since the thickness of the layer decreases by about 50% during re-melting and as a result of various losses. In fact, the nominal layer thickness depends on various process parameters, in particular the construction material used.

Depending on the nominal layer thickness, usually a minimum welding penetration depth and a maximum welding penetration depth, i.e. the highest welding penetration depth are specified for the process. Preferably the minimum welding penetration depth of a new melt bath in the already solidified material approximately corresponds to a nominal layer thickness, particularly preferably two nominal layer thicknesses. The highest welding penetration depth on the other hand preferably corresponds to eight times a nominal layer thickness, particularly preferably seven times a nominal layer thickness.

In the following example, a nominal layer thickness is specified as minimum layer thickness and eight times the nominal layer thickness as highest welding penetration depth. A typical nominal layer thickness in a laser sintering process is 30 μm layer thickness. This value corresponds in this example to the minimum welding penetration depth. A processing process with the said value is also designated as "30 μm process". The assumed actual thickness of the newly applied powder layer on the other hand is 120 μm. In particular, a depth extension of the melting bath starting from the solidified component surface of 150 μm is thus obtained. As mentioned, however the thickness of the newly applied powder layer approximately halves during processing. With a maximum welding penetration depth in the amount of eight times the nominal layer thickness, a maximum value for the depth extension of the melting bath starting from the solidified component surface of 7×30 μm=210 μm+30 μm=240 μm is obtained. Only the solidified layers are counted in these calculations whilst the completely unsolidified, newly applied powder layer is not taken into account.

The depth differences or the target welding penetration depths can now be specified in detail as follows relative to the nominal layer thickness:

Preferably a depth difference between a first location-dependent target welding penetration depth and a second location-dependent target welding penetration depth is at least the value of a nominal layer thickness, preferably at least twice the value of a nominal layer thickness, particularly preferably three times a nominal layer thickness.

Preferably at least one location-dependent target welding penetration depth extends over five times a nominal layer thickness whereas at least one second location-dependent target welding penetration depth preferably extends over at least seven times a nominal layer thickness.

As already explained above, there are several possibilities for achieving a suitable statistical distribution of the switching points depending on the specific formulation of the object.

If the interlocking is to be distributed uniformly in a component section (or segment) considered, a homogeneous probability distribution is possible for this.

As stated, a particularly preferred probability distribution is a Poisson distribution. A statistical distribution of the switching points which follows this distribution can preferably be achieved using the following equation:

$$dt=-\log(1.0—R)/I \tag{1}$$

This equation gives a time interval dt after which respectively one random switching should take place. Here it should be noted that with an approximately fixed scan speed, the time interval also corresponds to a specific path distance along the solidification path. Likewise the determined value can therefore also be output as a path distance difference.

In Equation (1) R is a value from a random generator which gives a random number distributed uniformly between 0 and 1 (usually a floating-point number).

The number I (a natural number greater than 0) is the intensity of the point process and determines the density of the switching points (it should not be confused with the intensity of the energy beam) The intensity I can be defined by: I=UP/v wherein UP is the number of switching points per metre of welding path and v designates the scan speed. Therefore if the intensity I is high, the switching points lie closer than at a low intensity. This will be explained hereinafter.

Preferably a value for UP can be at least 50 switching points per meter, particularly preferably at least 500 switching points per meter, further preferably at least 1000 switching points per metre.

Preferably a value for UP can be at most 1500 switching points per metre, particularly preferably at most 2000 switching points per metre, further preferably at most 2500 switching points per metre.

Depending on the component and requirements, however, in predetermined working regions, i.e. segments of the component, it can also be advantageous to increase or to reduce a spatial or temporal density of the interlocking points, e.g. a ratio of the number of switching points in relation to the number of microvectors in a cross-section or in extreme cases even to completely deactivate the interlocking mode.

For example, results from structural mechanical simulations are be used, for example, to provide a larger number of obstacles to crack propagation in component regions which can be subjected to strong static and/or dynamic loads in operation and in which the formation of a crack is therefore more probable.

In components in which the main damage is to be expected in the form of fatigue cracks, this method can be used to facilitate the maintenance and inspection of these components. For example, regions close to the component surface which are easily accessible during the subsequent usage of the component are specifically not processed by the method according to the invention or so-called crack corridors can be produced which guide an incipient crack specifically to the component surface whilst its propagation into the interior of the component is retarded or hindered. This makes it possible to carry out an inexpensive inspection of the component using methods such as, for example, dye penetrant testing by means of which the degree of material fatigue can easily be identified. The said crack corridors can specifically be locally placed through the careful arrangement of switching points or by suitable selection of densities optionally additionally depending on the component shape.

An operating mode with an increased number of interlocking points is preferably carried out, for example, in a code mode/infill mode, i.e. only in a central region with a distance of several tracks from any component edges, wherein edge in this sense can also be an inner edge of a component, e.g. around a hole or the like.

A variation in the form of a reduction as far as complete deactivation of the interlocking mode can in particular take place so that the number of interlockings, i.e. the density of the switching points is reduced to a defined outer region of the component in order, for example, to specifically direct cracks to the surface where, by means of simple test methods such as crack penetration testing, these can serve as an indicator for imminent failure of the component.

Such a configuration can be implemented, for example, by an inhomogeneous probability distribution. In a preferred variant, the intensity which determines the density of the switching points can be a function of the distance to the edge of the component, in particular decrease towards the edge. For example, in the Poisson distribution defined above by means of Equation (1), the intensity I can be a function of the distance from the edge of the component.

An example for this would be the function $$I(d) = I_0 \left( 0.5 + 0.5 \tanh\left(\frac{d-m}{A}\right) \right) \qquad (2)$$

This sigmoid function describes the change in the intensity of the point process as a function of the distance from the nearest edge as a continuous function. In this case, d designates the distance from the edge, m is the distance value from the edge, at which half the intensity of the point process in the component core, designated as $I_0$, should be reached and A is a dimension for setting the width of the gradual transition between the edge and the core region.

As already mentioned above, in the event of a change in the target welding penetration depth, in particular the welding region can also be changed, i.e. whether, for example, operation takes place in a deep welding method and/or a heat conduction welding method. At the present time, in practice during laser sintering of metals a so-called "deep welding process" ("keyhole mode welding") is mostly used. A welding process is designated as deep welding process when a vapour capillary, also called "keyhole" is formed. The incident energy beam, in particular laser beam, here generates a lake of molten material, respectively metal. If the lake surface of the material reaches its boiling point, the vapour phase pushes the melt away laterally and downwards and thus produces the vapour capillary. The diameter of this keyhole is smaller than that of the energy beam or laser beam. An advantage of this deep welding process lies in the high depth effect. That is, measured at the focal diameter, significantly higher penetration depths can be achieved than if such vaporization had not taken place. A welding process without vaporization on the other hand is also designated as "heat conduction welding" (also "conduction mode welding" or "conduction laser welding").

Preferably within the framework of the invention, a heat conduction welding process is used at least temporarily and a deep welding process is used at least temporarily. Since the change in process is aimed at changing the target welding penetration depth, the switching can take place randomly within the framework of the defined random distribution, as explained above.

The type of welding process can be determined, for example, by observation of the impact surface of the energy beam on the construction field by means of a camera (optical, IR, UV), by analysis of the radiation emitted by the impact surface or however by analysis of test objects produced during preliminary experiments. The extensive omission of emissions caused by the vapour capillaries produced in the deep welding process, i.e. for example, splashes or gas jets as well as metal vapour can be used as a criterion for the presence of a heat conduction welding process. A further criterion is the aspect ratio of the melt bath (diameter of the melt path parallel to the working plane in relation to the depth, i.e. perpendicular to the working plane) which in heat conduction welding lies above 2:1, in any case below 100:1 or/however the surface temperature of the construction material. If the latter lies below the vaporization point of one or all the components of the construction material, then the "keyhole" necessary for the deep welding process cannot be formed. Usually a deep welding process takes place when the power introduced per area exceeds 1 MW/cm$^2$.

In this case, preferably it is possible to switch over from a heat conduction welding process temporarily into a deep welding process. Alternatively or additionally, preferably a heat conduction welding path can be temporarily superimposed with a deep welding path.

For example, a deep welding melt bath can be locally produced briefly in the heat conduction welding melt bath, whose depth extension is varied. In this way, an interlocking comes about. In this case, the heat conduction melt bath need not be varied. Both melt baths can therefore at least temporarily be produced at the same time, wherein the heat conduction welding melt bath is preferably driven permanently by the construction material.

This can, for example, preferably be accomplished by a temporary superposition of various intensity profiles in the working plane. For example, a relatively large top-hat profile beam can be superimposed temporarily by one or more small Gaussian profile beam(s). The beam extensions of the two beam profiles (top-hat and Gaussian) can in this case preferably differ by a factor of 5 to 10. A beam extension is to be understood in this sense as an arbitrary dimension or distance transversely (to the beam axis) through the beam, i.e. for example, a beam diameter or a beam width wherein a beam width is always to be understood as the extension perpendicular to the current movement direction of the impact surface on the construction field. In this case, the distance need not necessarily run through the beam axis or through the centre of the (entire) intensity distribution, in particular if the energy beam does not have a rotationally symmetrical intensity distribution. The beam extension is defined here such that it runs on the defined distance from one edge to the opposite edge of the intensity distribution, wherein the edge in turn is randomly defined here so that 99% of the radiation power of the energy beam is located inside the edge (i.e. in the area enclosed by the edge). For this purpose, besides, two separate beams need not necessarily be combined but an intensity distribution per beam formation can be produced in such a manner that a superposition of two or more separate beams is simulated.

As has already been explained above, when creating the control data before the start of the entire construction process (or at least before the start of the part of the construction process in which the respective layer is solidified), it can be specified or calculated preferably in advance at which points the statistically distributed switching points (e.g. in the respective layer) are located. This can preferably be accomplished within the framework of a type of simulation in which virtually the entire solidification path or the solidification paths is/are travelled in the relevant region of the cross-section of the component in the relevant layer and the switching points are thereby set statistically or randomly (e.g. using Equation (1) as has been explained above).

As mentioned, the control data therefore preferably comprise a welding-depth-map or switching map for each material layer or material application plane, i.e. the actual construction plane in which the laser travels over a newly applied layer. The welding-depth-map in this case comprises at least the switching points, i.e. at least the locations at which the switching takes place.

Preferably the welding-depth-map additionally contains the information as to which location-dependent target welding penetration depth should be intentionally set at which switching point. The location and in addition, the absolute parameters such as, for example, the energy beam power, the intensity distribution in the energy beam, the focal setting, the scan speed and/or a local supply of a gas or a gas mixture to the construction field or the parameter changes then predefined in the welding-depth-map, for example, where the energy beam is to be operated in each case during a movement along the different solidification paths (whereby the local oscillation regime is additionally specified). If the control data comprise such a complete welding-depth-map with the substantial parameters or parameter changes, then in particular the modifications within the scan track, for example, fade-in/fade-out etc. can optionally be specified therein.

The form of the welding-depth-map or switching map is arbitrary, it can be specified for example in pixel form or also in the form of functions or indirectly as parameter variations for the irradiation unit along the solidification paths to be travelled. The welding-depth-map can be specified for each layer separately or also as a 3D volume card. Advantageously for each spatial point which is to be approached, the target welding penetration depth can be specified in a location-dependent manner) directly or by specifying the parameters or parameter variations as explained above) so that the welding-depth-map can be used as a template for control of the machine.

The creation of a welding-depth-map additionally has a further considerable advantage. Preferably a spatial distribution of the switching points in the welding-depth-map can be checked with regard to a quality criterion, preferably with regard to a target distribution function of the distances of the switching points.

This check can—if the welding-depth-map is created in advance, i.e. before the actual scanning process—also preferably be carried out accordingly before the scan process. In this case, if the quality criterion is not satisfied, a new or amended welding-depth-map can preferably be specified or calculated.

That is, the welding-depth-maps are therefore firstly checked "virtually", if necessary (e.g. iteratively) amended and only when they are correct, are the modified welding-depth-maps used for control, i.e. the control data are generated in which the switching points are taken into account according to the welding-depth-map. During the checking the potential crack length can be reduced by means of the quality criterion, e.g. by sufficiently maintaining the target distribution function.

The quality inspection is preferably carried out by a comparison with a target distribution function which gives information about a distribution. Such a target distribution function can, for example, comprise a G-function. The G-function gives information about whether the distribution of the specified switching points comes close to a Poisson distribution which corresponds to an ideal profile. The G-function is designated in English as "nearest neigh-bour distance distribution function" or also as "event-to-event distribution" or "interevent distribution". The G-function of a point process X is the cumulative distribution function G of the distance of a typical random point X from the nearest other random point X. The curve of the G-function gives probabilities depending on possible crack lengths by means of which a crack of length r impinges upon an obstacle. If, for example, there is a probability of 100% for the crack length r=200 μm, a crack having a probability of 100% is therefore deflected once when it has covered the distance r=200 μm. In other words, r=200 μm is the maximum length a crack can run before it meets an obstacle. A value of r of 200 μm is also a particularly suitable value.

For the quality inspection, a tolerance range can be specified in advance about the target distribution, for example, the optimal G-function. If the actual distribution of the switching points determined in the inspection or the distribution of the distances of the nearest neighbours now falls within this tolerance range, the quality of the specified distribution of the switching points is sufficient. Otherwise, if the curve lies outside the predefined tolerance ranges about the predefined target distribution function, the quality is not sufficient. Accordingly, a new welding-depth-map can be generated and its distribution of random points again compared with the target function, preferably a G-function in order to arrive iteratively at an optimal distribution of the switching points.

A test function for comparison with the target distribution, for example, the optimal G-function, can be determined as follows from the switching map:

Firstly, an arbitrary first switching point is selected from the switching map. For this all the distances from all the other switching points in the switching map are determined and the shortest distance stored in a distance list. This is gradually carried out for all the switching points. When the distance from the nearest switching point has been determined for all the switching points, the distance list is sorted according to distances and the duplicates are removed. The distance list thus obtained ultimately forms the sought test function which can be simply plotted jointly with the ideal target distribution function provided with a tolerance range in order to compare them, for example, for a clear representation of the quality. This will be illustrated hereinafter by means of an example. However, a purely automatic comparison without a printout is naturally also possible.

If the switching points are firstly created online during the construction process, a quality inspection can be carried out at least in retrospect by means of a creation and examination of a welding-depth-map, on the basis of which, for example, a component is discarded or a usage restriction is imposed on it.

In any case therefore with the aid of the invention, not only the quality of the components can be improved but a considerable quality assurance advantage can also be achieved.

The invention will be explained once again in detail hereinafter with reference to the appended figures by means of exemplary embodiments. In this case, in the various figures the same components are provided with identical reference numerals. In the figures:

BRIEF DESCRIPTION OF THE DRAWINGS

FIG. 9 shows a schematic diagram of a cross-section through a component or a plan view of a component layer with an inner region and an outer region.

DETAILED DESCRIPTION OF THE EMBODIMENTS

The following exemplary embodiments are described with reference to a device 1 for additive manufacture of components in the form of a laser sintering or laser melting device 1, wherein it is explicitly pointed out once again that the invention is not restricted to laser sintering or laser melting devices. The device is therefore briefly designated hereinafter-without restricting the generality—as "laser sintering device" 1.

Figure 1:
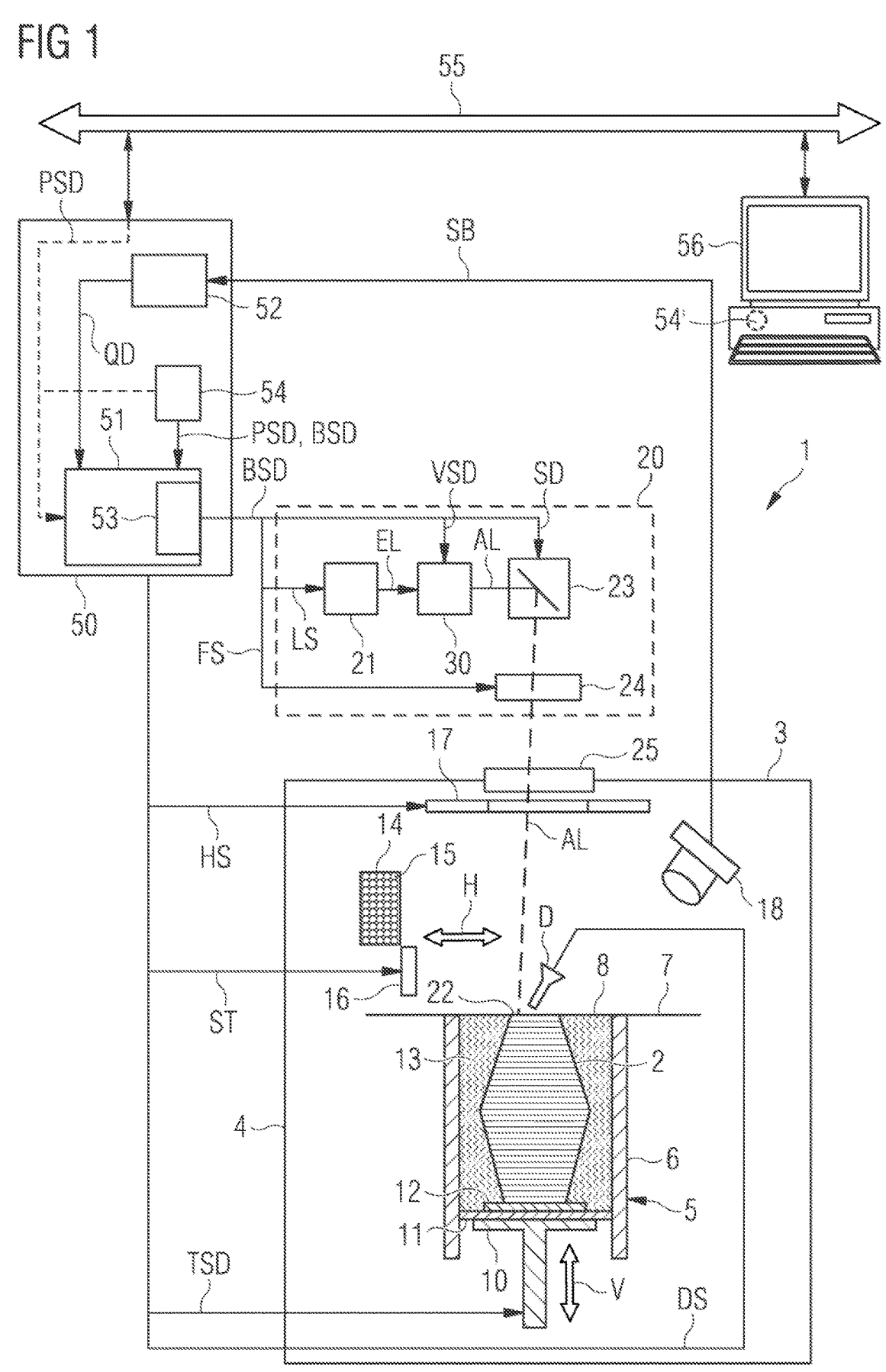
FIG. 1 shows a schematic partially sectional view of an exemplary embodiment of an additive manufacturing device with a control data generating device according to the invention.

Such a laser sintering device 1 is shown schematically in FIG. 1. The device comprises a process chamber 3 or a process space 3 with a chamber wall 4 in which the manufacturing process substantially takes place. A container 5 open towards the top with a container wall 6 is located in the process chamber 3. The upper opening of the container 5 forms the respectively current working plane 7. The region of this working plane 7 located inside the opening of the container 5 can be used for construction of the object 2 and is therefore designated as construction field 8.

The container 5 has a base plate 11 which is movable in a vertical direction V, which is arranged on a support 10. This base plate 11 terminates the container 5 downwards and thus forms its base. The base plate 11 can be formed integrally with the support 10 but it can also be a plate formed separately from the support 10 and be fastened to the support 10 or simply mounted thereon. Depending on the type of specific construction material, i.e. for example the powder used and the manufacturing process, a building platform 12 can be mounted on the base plate 12 as a building substrate on which the object 2 is constructed. Fundamentally however, the object 2 can also be constructed on the base plate 11 itself, which then forms the building substrate.

The fundamental construction of the object 2 is accomplished by applying a layer of construction material 13 initially to the building platform 12, then, as is explained subsequently, the construction material 13 is selectively solidified using a laser beam, AL as energy beam at the points which should form parts of the object 2 to be manufactured, then with the aid of the support 10 the base plate 11, therefore the building platform 12 is lowered and a new layer of construction material 13 is applied and selectively solidified etc. In FIG. 1 the object 2 constructed in the container on the building platform 12 is shown underneath the working plane 7 in an intermediate state. Said object already has a plurality of solidified layers surrounded by construction material 13 that has remained unsolidified. Various materials can be used as construction material 13, preferably powder, in particular metal powder, plastic powder, ceramic powder, sand, filled or mixed powder or also pasty materials.

Fresh construction material 15 is located in a storage container 14 of the laser sintering device 1. With the aid of a coater 16 which is movable in a horizontal direction H, the construction material can be applied in the working plane 7 or within the construction field 8 in the form of a thin layer.

An additional radiation heater 17 can be optionally located in the process chamber 3. This can be used for heating the applied construction material 13 so that the irradiation device used for selective solidification need not introduce too much energy. That is, for example, with the aid of the radiation heater 17, a quantity of basic energy can be introduced into the construction material 13 which is naturally still below the necessary energy at which the construction material 13 fuses or even sinters. An infrared emitter, for example, can be used as radiation heater 17.

For the selective solidification, the laser sintering device 1 has an irradiation device 20 or specifically an exposure device 20 with a laser 21. This laser 21 generates a laser beam EL which is initially supplied to a beam forming device 30 (as input energy beam EL or input laser beam EL). The beam forming device 30 can, as has already been described above, be used to modify the intensity distribution, i.e. the intensity profile of the energy beam, for example, also in order to superimpose a Gaussian profile on a top hat profile. For this purpose, the beam forming device 30 can be controlled by means of suitable intensity distribution control data VSD.

For this purpose, a preferred beam forming device 30 can initially have, on the input side for example, a beam splitter in the form of a thin-film polarizer which splits the input laser beam EL into two linearly polarized partial beams. Each of these linearly polarized partial beams can be guided to its own beam forming element. This beam forming element is responsible for the actual beam forming. Here this can comprise, for example, so-called passive DOEs (DOE=Diffractive Optical Element) which operate reflectively and modify the wave front of the incident partial beam by local modulation of phase and/or amplitude. An example for this would be LCOS microdisplays (LCoS=Liquid Crystal on Silicon) which can be controlled with the corresponding intensity distribution control data VSD which can be supplied by the irradiation control interface 53 of the control device 50 of the laser sintering device 1 which is described hereinafter.

The (output) energy beam or laser beam AL optionally modified by the beam forming device is then deflected by means of a following deflecting device 23 (scanner 23) in order to move the solidification paths (i.e. exposure paths or tracks) provided according to the exposure strategy in the layer to be respectively solidified and to selectively introduce the energy. That is, by means of the scanner 23 the impact surface 22 of the energy beam AL is moved on the constructive field 8, wherein the actual movement vector or the movement direction (scan direction) of the impact surface 22 on the construction field 8 can vary frequently and rapidly. In this case, this laser beam AL is focussed in a suitable manner by a focussing device 24 onto the working plane 7. The irradiation device 20 is preferably located here outside the process chamber 3 and the laser beam AL is guided into the process chamber 3 via a coupling-in window 25 mounted on the upper side of the process chamber 3 in the chamber wall 4.

The irradiation device 20 can comprise, for example, not only one but a plurality of lasers. Preferably this can comprise gas or solid-state laser or any other type of laser such as laser diodes, in particular VCSEL (Vertical Cavity Surface Emitting Laser) or VECSEL (Vertical External Cavity Surface Emitting Laser) or an array of these lasers. Quite particularly preferably within the framework of the invention, one or a plurality of unpolarised single-mode lasers e.g. a 3 kW fibre laser having a wavelength of 1070 nm can be used.

In the exemplary embodiment shown, an optional, preferably movable and/or adjustable nozzle D is disposed in the process chamber 3, which can be used to locally supply a gas or a gas mixture in the region of the impact surface of the laser beam AL on the construction field 8 in order to thereby influence the target welding penetration depth.

The laser device 1 furthermore contains a sensor arrangement 18 which is suitable for detecting process radiation emitted during impact of the laser beam AL on the construction material in the working plane. This sensor arrangement 18 operates in a spatially-resolved manner, i.e. it is capable of detecting a type of emission image of the respective layer. Preferably an image sensor or a camera 18 is used as sensor arrangement 18 which is sufficiently sensitive in the region of the emitted radiation. Alternatively or additionally, one or a plurality of sensors can be used to detect an optical and/or thermal process radiation, e.g. photodiodes which detect electromagnetic radiation emitted by a melt bath under an incident laser beam AL or temperature sensors for detecting an emitted thermal radiation (so-called melt pool monitoring). An assignment of the signal of a self-non-spatially resolving sensor to the coordinates would be possible since the coordinates used for controlling the laser beam are each temporally assigned to the sensor signal. In FIG. 1 the sensor arrangement 18 is arranged inside the process chamber 3. However, it could also be located outside the process chamber 3 and then detect the process radiation through a further window in the process chamber 3.

The signals detected by the sensor arrangement 18 can be transmitted as a process chamber sensor data set or layer image SB here to a control device 50 of the laser device 1, which also serves to control the various components of the laser sintering device 1 for complete control of the additive manufacturing process.

For this purpose, the control device 50 has a control unit 51 which controls the components of the irradiation device 20 via an irradiation control interface 53, namely here transmits laser control data LS to the laser 21, transmits intensity distribution control data VSD to the beam forming device 30, scan control data SD to the deflecting device 23 and focus control data FS to the focusing device 34. The entirety of these data can be designated as exposure control data BSD.

The control unit 51 also controls the radiation heater 17 by means of suitable heating control data HS, the coater 16 by means of exposure control data ST and the movement of the support 10 by means of support control data TSD and thus controls the layer thickness. Furthermore, the control unit 51 also controls the nozzle D with the aid of nozzle control data DS.

In addition, the control device 50 here comprises a quality data determining device 52 which receives the process chamber sensor data set SB and based on this, determined quality data QD which can be transmitted, for example, to the control unit 51 in order to be able to intervene in a regulating manner in the additive manufacturing process.

The control device 50 is here coupled to a terminal 56 with a display or the like, for example, via a bus 55 or another data connection. Via this terminal an operator can control the control device 50 and therefore the entire laser sintering device 1, e.g. by transmission of process control data PSD.

In order to optimize the production process, the control data are generated or modified by means of a control data generating device 54, 54' in the manner according to the invention so that the device 1 is controlled at least temporarily in an interlocking mode according to the invention so that when the energy beam AL is moved across the construction field 8 a location-dependent target welding penetration depth of the laser beam is intentionally switched at a plurality of statistically distributed switching points P, as has already been explained above. Hereinafter more specific design variants are once again presented for this.

A control data generating device 54 can, for example, be part of the control device 50 and be implemented there, for example, in the form of software components. Such a control data generating device 54 integrated in the control device 50 can, for example, receive the process control data PSD and modify it accordingly so that the device 1 is controlled at least temporarily in the interlocking mode according to the invention and then further transmit the correspondingly modified control data PSD to the control unit 51. The modified control data PSDF comprise in particular modified exposure control data BSD but optionally also other modified control data such as, for example, amended exposure control data ST or support control data TSD in order to select a suitable layer thickness or suitable nozzle control data DS in order to set the welding penetration depth by the local gassing. Alternatively however, only the exposure control data BSD can be modified in the control data generating device 54 and transmitted to the control unit 51 so that the irradiation control interface 53 operates with the modified exposure control data BSD.

In a particularly preferred variant the control data generating device 54' is implemented on an external computer unit, for example, here the terminal 56 and delivers in advance process control data PSD with appropriately suitable exposure control data BSD by means of which the device 1 is controlled so that the intended interlocking mode is achieved in the desired regions of the component. In this case, the internal control data generating device 54 present here in the control device 50 can be dispensed with.

As already mentioned, the process control data PSD generated or modified by the control data generating device 54, 54', in particular exposure control data BSD, can then be seen as target values which are then used in the control unit 51 for a regulating process wherein, for example (as one possibility) the quality data QD can then be included as actual values.

It is pointed out once again at this point that the present invention is not restricted to such a laser sintering device 1. It can be applied to other methods for the generative or additive manufacture of a three-dimensional object by layer-by-layer application and selective solidification of a construction material, wherein an energy beam for solidification is delivered onto the construction material to be solidified. Accordingly, the irradiation device can also not only be a laser, as described here, but any device by means of which energy as wave or particle radiation can be applied selectively onto or into the construction material. For example instead of a laser, another light source, an electron beam etc. could be used.

Although only a single object 2 or component 2 is shown in FIG. 1, it is possible and usually also usual to manufacture a plurality of objects in parallel in the process chamber 3 or in the container 5. To this end, the construction material is scanned in layers by the energy beam at locations which correspond to cross-sections of the objects in the respective layer.

Figure 2:
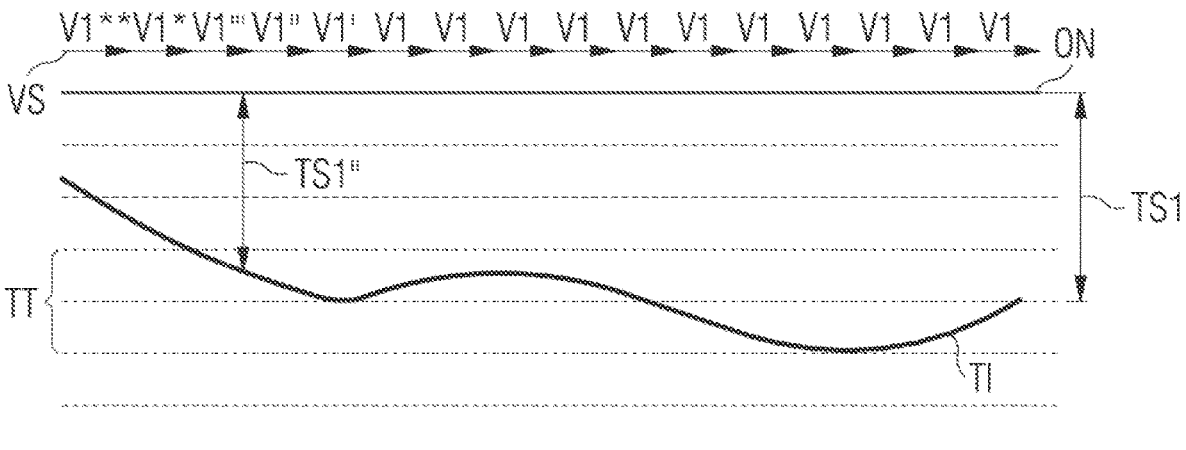
FIG. 2 shows schematic principle diagrams of the profile of the welding penetration depth over several nominal layer thicknesses along a hatch (upper graph during fade-in, middle graph in a central hatch region, lower graph during fade-out) in a procedure according to the prior art.
Figure 2:
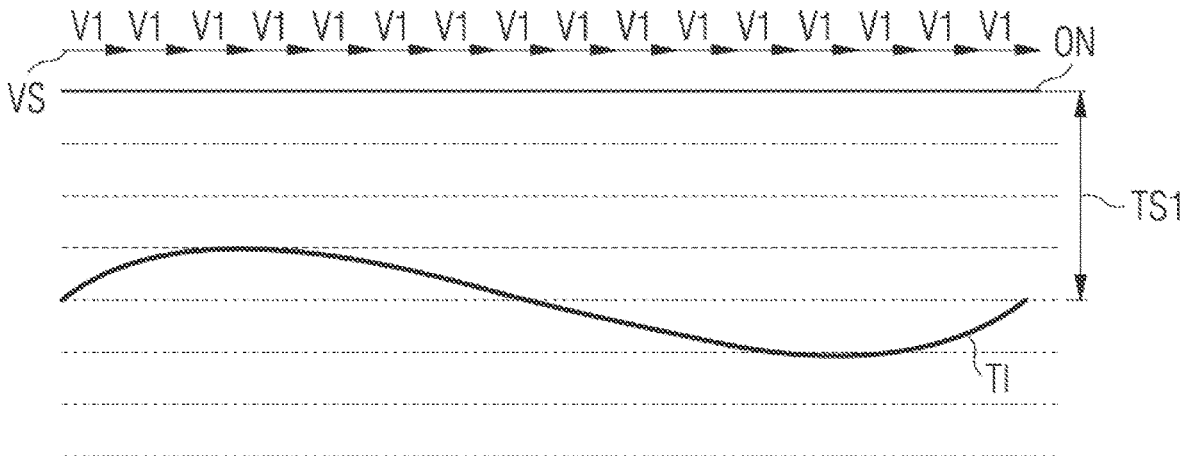
Figure 2:
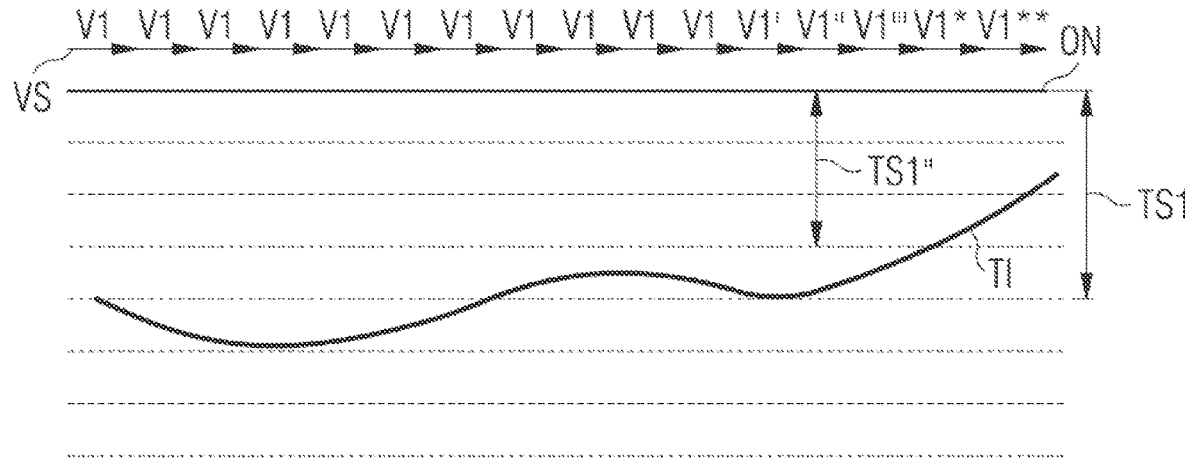

In order to better explain the interlocking mode according to the invention, FIG. 2 shows by means of three schematic sectional views through a small region of an upper part of a component to be currently manufactured, the profile of the actual welding penetration depth TI along a single hatch (as current solidification path) across a plurality of material layers (nominal layer thicknesses) in a procedure according to the prior art.

Above the layer arrangement comprising the depicted material layers, which ends at a "nominal surface" ON, a vector trace VS comprising a plurality of so-called microvectors V1\*\*, V1\*, V1''', V1'', V1', V1 is shown in each case by means of the sectional views. The microvectors represent the smallest control steps and be considered as time information. Here, the upwardly pointing solidified cross-sectional surface of the component in the powder bed method is seen as "nominal surface", i.e. the uppermost layer in the z direction of the component being manufactured which is actually solidified. In this case, an average height value in the z direction is optionally assumed if the solidified surface exhibits too-strong irregular-ties such as, for example, excess roughness. This nominal surface therefore differs from the working plane (or the coater plane since the working plane is defined, for example by the coater blade) insofar as the powder layer currently to be solidified is included at the working plane.

A situation at the beginning of a hatch is shown in the uppermost sectional view in FIG. 2. In a fade-in region in a run-in ramp the target welding penetration depth (which is subsequently designated as "target depth" for short) is firstly gradually increased continuously under the nominal surface ON of the component to be manufactured. The microvectors V1\*\*, V1\*, V1''', V1'', V1' accordingly represent microvectors with different standard settings of the energy beam or laser beam for different target depths which are to be achieved with the setting values of the respective microvector V1\*\*, V1\*, V1''', V1'', V1'. For example, the figure shows a specific first target depth TS1'' which is achieved by or after the microvector V1''. The different target depths can be set, for example, by setting various laser powers which is subsequently assumed as a simple representative example. However, as has been mentioned several times, the target depth can also be predefined by a setting of a plurality of further parameters or parameter combinations. In the case shown, for example, the laser power increases in the order of the microvectors V1\*\*, V1\*, V1''', V1'', V1' with each of the microvectors V1\*\*, V1\*, V1''', V1'', V1'.

The gradual, relatively slow increase in the target depth in the run-in ramp region according to the prior art serves to avoid any splash formation at the beginning of a hatch. After the end of the microvector V1' the target depth TS1 is finally achieved with the microvectors V1 (with a standard setting of the laser beam for the middle section of a hatch outside the fade-in region and the fade-out region).

In this region during a middle phase or a middle part of the hatch the first target depth or standard target welding penetration depth TS1 is maintained for a long time in the usual procedure according to the prior art. This process situation is shown in the middle sectional view. The actual welding penetration depth TI fluctuates slightly about the fixedly set target depth TS1 with a fluctuation width TT of about two material layers. This fluctuation width TT is significantly smaller than the target depth TS1. The fluctuations shown constitute—usually periodic-long-wave uncontrolled and unintentional process fluctuations.

The lower sectional view shows a situation at the end of a hatch. In the fade-out region provided there the target depth according to the prior art is again reduced gradually relatively slowly, i.e. a gradual reduction of the first target depth takes place with the microvectors V1', V1'', V1''', V1\*, V1\*\* (in the opposite sequence as in the fade-in region. Here however, again only a specific location-dependent target depth TS1'' is again shown as an example, which is achieved by or after the microvector V1''. As a result of the run-out ramp thus produced, a reduction in the porosity is achieved at the end of the hatch.

It is pointed out for the sake of completeness that the slight unintentional longer-wavelength fluctuations can also occur in the fade-in region and fade-out region. The slight fluctuations of the actual welding penetration depth about the desired first target welding penetration depth or target depth which are shown roughly schematically in the sectional views and which also occur unintentionally in the prior art are, however, too small to form a desired interlocking at the layer boundaries and thus constitute an effective obstacle for a crack propagating in the component.

Thus, a special interlocking mode is used according to the invention.

Figure 3:
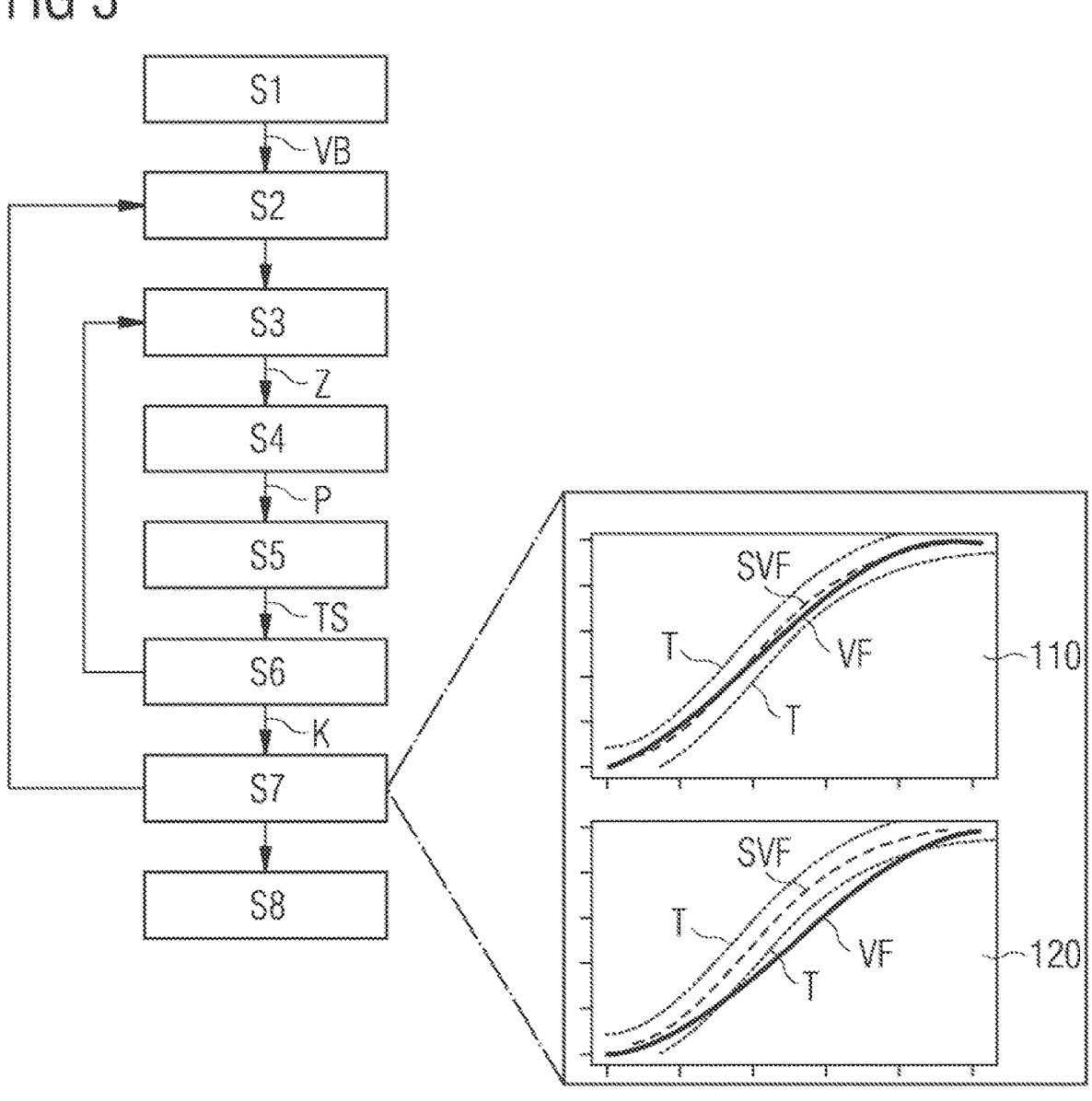
FIG. 3 shows a flow diagram of a possible process sequence of an exemplary embodiment of a method according to the invention for generating control data for a device for additively manufacturing a component.
Figure 4:
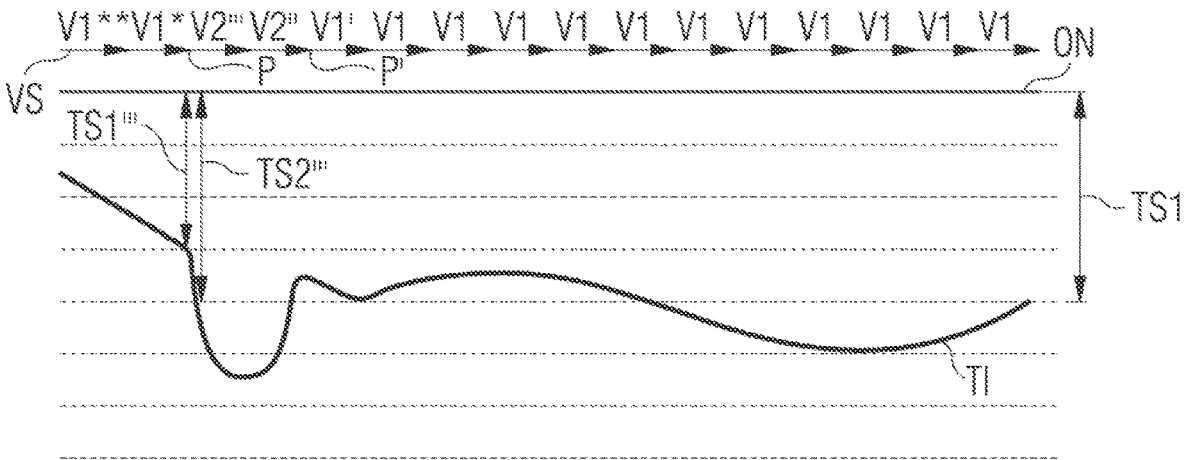
FIG. 4 shows schematic principle diagrams of the profile of the welding penetration depth over several nominal layer thicknesses along a hatch (upper graph during fade-in, middle graph in a central hatch region, lower graph during fade-out) similar to FIG. 2 but now in a procedure according to one exemplary embodiment of the invention.
Figure 4:
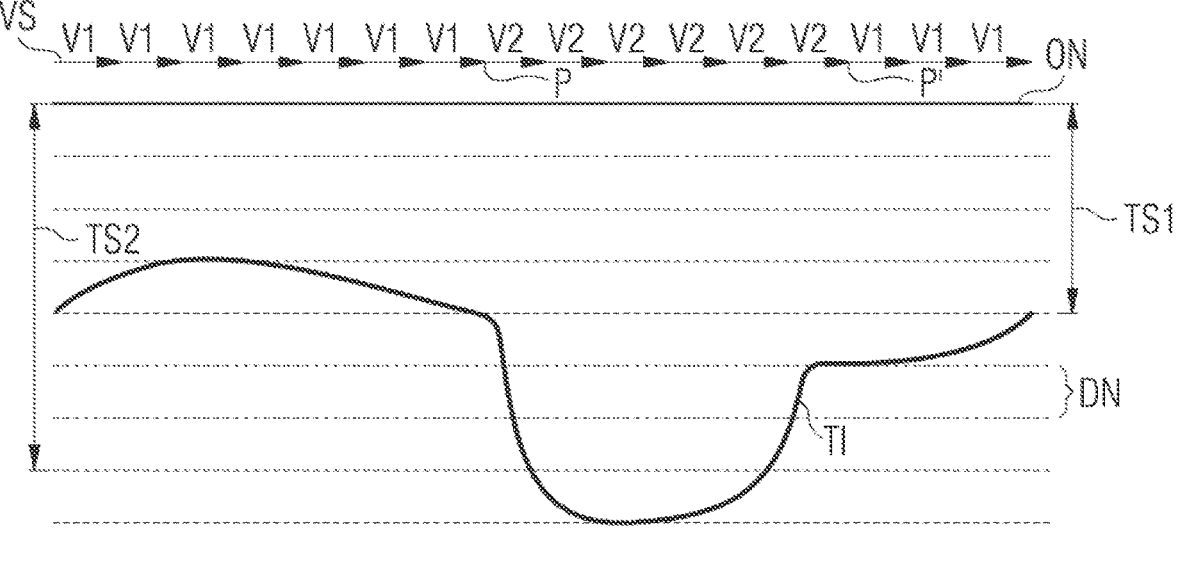
Figure 4:
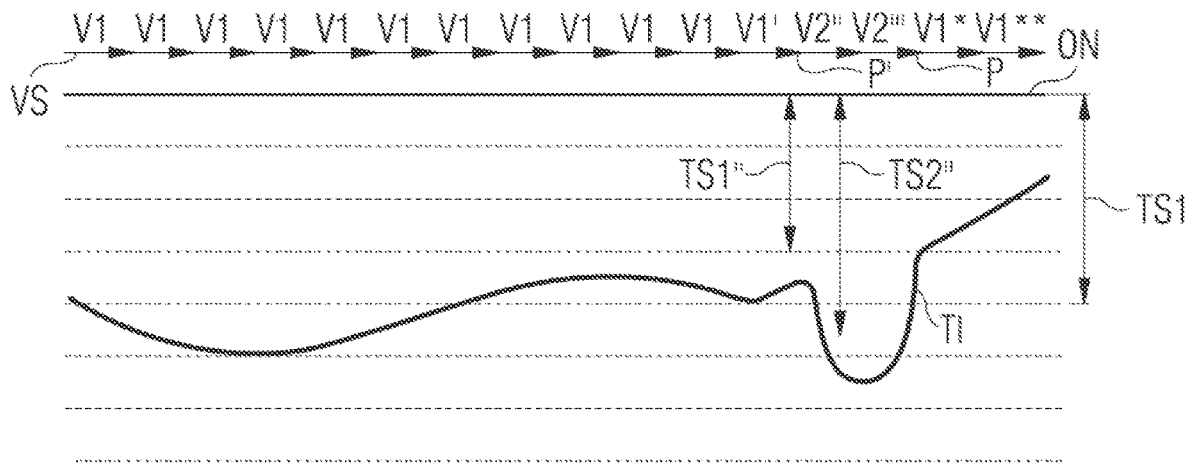

For this purpose, FIG. 3 shows a flow diagram of a possible process sequence of an exemplary embodiment of a method according to the invention for generating control data for a device for additively manufacturing a component.

In step S1, solidification paths VB for a layer of a three-dimensional object are firstly calculated on the basis of digital 3D construction data. Then in step S2, a construction simulation of a virtual additive manufacturing process is started in the energy beam or laser virtually travels all the solidification paths VB. The process can begin, for example, with a location-dependent first target welding penetration depth (or first target depth) which is specified for the respective location as first target depth.

In order to achieve the statistical interlocking in the course of the process, in step S3 a random generator is then initially started in order to find the next switching point or initially the next switching point Z of the adaptation of the irradiation parameter values to the location-dependent, new second target welding penetration depth (or second target depth) within the solidification path. This can be accomplished for example—if a statistical distribution of the switching points P according to a homogeneous Poisson distribution is desired—with the aid of Equation (1) explained above whereby in each case, the time interval dt up to the next switching point Z is determined on the basis of the (quasi) random number.

In step S4, on the basis of the previously calculated switching point Z a switching point P in the respective solidification path VB is determined at which, instead of the microvectors provided (with the values for the first location-dependent target depth actually provided there in the prior art), new microvectors (with the values for the second location-dependent target depth) are inserted or calculated at which a variation of at least one irradiation parameter value for a defined number of microvectors should take place.

In step S5, a new irradiation parameter value is then selected for the new (second) target welding penetration depth TS at the switching point P, for example, the laser power, for the second location-dependent target depth. For simplicity it is assumed for this exemplary embodiment that switching to and from always takes place between a first standard target welding penetration depth (or standard target depth) predefined per se at the respective location (i.e. location-dependent) and a location-dependent second special target welding penetration depth (or special target depth, wherein switching to the special target depth takes place at a random switching point and in a defined temporal spacing of, for example, a few microvectors after the switching point, switching takes place (back) to the first standard target depth.

The number of microvectors during which operation takes place with the second location-dependent target depth instead of the first location-dependent target depth can, for example, be predefined, in particular material-dependent. It can depend on how rapidly a target welding penetration depth TS can be changed.

In step S6, it is then checked whether the virtual irradiation process for the component layer is complete. If not, the process returns to step S3. Otherwise a switching map K or welding-depth-map K is created from the random distribution of switching points P and a transition is made to step S7.

In step S7, it is checked now well the distribution of switching points P in the surface corresponds to the desired statistic distribution, i.e. whether for example, as has already been explained, the distribution of these switching points lies within a tolerance band about the ideal nearest neighbour distance function G.

FIG. 3 shows on the right of the flow diagram such a test in two diagrams 110, 120. In the first upper diagram 110, a test function VF shown by a continuous line (which was calculated as nearest neighbour distance function G from the switching map as explained hereinafter) lies within a tolerance range T indicated by a dotted line about a target distribution SVF shown by a dashed line (here the profile of the ideal G-function). In this case, the switching map forming the basis for the test function VF could be accepted for a production process. In the lower diagram 120 however, the test function VF shown by the continuous line is located outside the tolerance range T shown by the dotted line. In this case, the switching map must be discarded. If this check is negative, the process returns to step S2 and ultimately a new switching map is created. Otherwise, a transition is made to step S8 in which finally the adapted control data are stored and/or provided to a control device of a manufacturing device.

The test function VF as a nearest neighbour distance function can be determined from the switching map K, as explained above whereby all the distances between all the switching points P in the switching map K are determined and the respectively shortest distances are stored in a distance list, which is then sorted and cleaned of duplicates.

In the next FIGS. 4 to 8 it will be shown for various examples how the construction of the layers in the interlocking mode can vary.

For this purpose, FIG. 4 again shows schematically three sectional views similar to the diagram in FIG. 2 in order to show the profile of the actual welding penetration depth TI along a single hatch over several material layers, in this case however compared to FIG. 2 in the interlocking mode.

The microvectors V1**, V1*, V1''', V1", V1' are again shown above the layer arrangement at which, as in the prior art according to FIG. 2, the energy beam is operated so that a first target depth TS1, TS1" can be achieved. In addition, however, microvectors V2 with increased power and microvectors V2''', V2" with increased fade-in or fade-out power are shown. The microvectors V2, V2", V2''' with increased power represent sections in which, instead of the first target depth TS1, TS1" an increased second target welding penetration depth or second target depth TS2, TS2" is achieved. Instead of or in addition to an increase in power however, the second target depth TS2, TS2" can also be achieved by other parameter changeovers, as has already been explained.

In the upper sectional view, the profile of a welding path in the fade-in region is initially again shown. This process is assigned the microvectors V1**, V1*. The target depth (and therefore the actual welding penetration depth TI) increases gradually in the fade-in region to a value TS1'''. Then, at the microvector V2''' at a randomly set switching point P there is a sudden increase to a second target depth TS2", wherein the actual welding penetration depth TI decreases accordingly rapidly. If, for example, the first target depth TS1''' is a maximum of three nominal layer thicknesses, the second target depth TS2''' increases in the region of the obstacle to more than five nominal layer thicknesses. Then the target depth at the microvector V1' at a point P' (after two microvectors) is again reduced to a first target depth of about four nominal layer thicknesses provided there per se (without the procedure according to the invention; cf. FIG. 2) and the fade-in region is then left at the microvector V1.

In a middle region of the hatch shown in the middle sectional view, operation then again takes place initially with an energy beam having a standard power with a standard first target depth TS1 of four nominal layer thicknesses (as in FIG. 2). Here also however, the actual welding penetration depth TI naturally fluctuates in a long-wave manner between three and five nominal layer thicknesses about the target depth TS1 of four nominal layer thicknesses.

Other than in the prior art however, at a random switching point P along the hatch, here, for example at the microvector V2, a switching again takes place abruptly into a second target welding penetration depth or target depth TS2 (now of seven nominal layer thicknesses) which accordingly result in a significant increase in the actual welding penetration depth TI, which here can even (as a result of the fluctuations currently present which can be superimposed on one another) extend to eight nominal layer thicknesses. After only six microvectors V2 with the second target depth TS2, at point P' the process switches back to the first target depth TS1, with the result that the actual welding penetration depth TI is then reduced relatively rapidly to five nominal layer thicknesses and then slowly (due to the unintentional superposed fluctuations) to four nominal layer thicknesses.

A situation at the end of a hatch is shown in the lowest sectional view similarly to FIG. 2. At the microvectors V1 the actual welding penetration depth TI initially fluctuates in a long-wave manner about the first standard target depth TS1 provided there of four nominal layer thicknesses. At the beginning of the fade-out region at the microvector V2", an obstacle is again produced here whereby at the switching point P (instead of the first target depth TS1" actually provided there) up to a following point P' the solidification depth is initially raised to a second target depth TS2", which is possible there, of four and a half nominal layer thicknesses with the result that the actual welding penetration depth TI briefly drops abruptly to over five nominal layer thicknesses and increases again. At point P' the target depth is reduced rapidly again after the second microvector V2'" after the switching point P.

As a result of the abrupt change of the actual welding penetration depth TI accompanying the intentional, relatively rapid switching of the target depth, an effective obstacle for a possible crack in the layer arrangement is formed in all regions.

The short-term variations of the target depth to form obstacles and therefore the extension of the obstacles is approximately 6 to 10 microvectors, i.e., for example, 60 to 70 μm, whereas for example, the length of the fade-in regions and the fade-out regions is approximately 5 to 100 microvectors and the length of a complete hatch is about 100 to 1000 microvectors (on a length of, for example, 10 mm). It is pointed out at this point that the various microvectors in the fade-in region, in the middle region and in the fade-out region can each be a plurality of microvectors of the same type and are only substantially reduced in terms of the number for reasons of space.

Likewise there is usually a considerably higher number of randomly or statistically distributed switching points P along a hatch, although it is naturally not excluded that only a few switching points lie within a hatch, for example, in extreme cases only a single switching point or even no switching point at all. The frequency depends on the intensity I (cf. Equation (1) above for the Poisson distribution) of the probability distribution.

Figure 5:
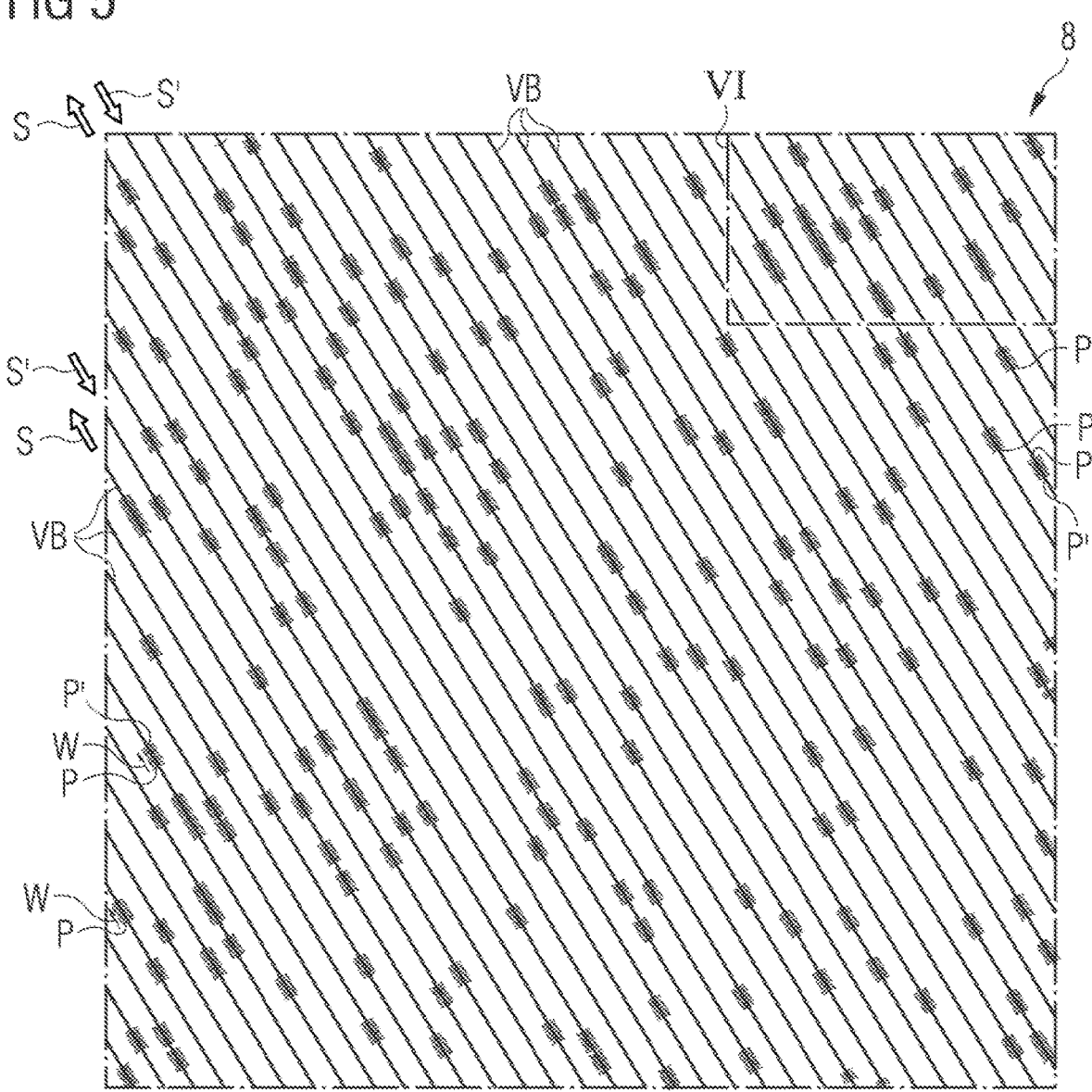
FIG. 5 shows a schematic diagram of solidification paths (here again hatches located next to one another) in a section of a component layer with statistically distributed switching points indicated on the hatches and path lengths as far as a back-switching according to a first exemplary embodiment.

In order to illustrate this, FIG. 5 shows schematically an enlarged section from a construction field 8 from above with solidification paths VB, here a plurality of hatches VB.

The hatches each run in a scanning direction S or S'. If the process has reached the edge of a working region, for example, a track which is composed of the hatches, the scanning direction S or S' is reversed and is changed to a neighbouring hatch VB running parallel to the preceding hatch VB.

Shown here are the randomly set switching points P at which switching takes place in each case from a first target depth to a second target depth, with a schematic diagram of the path lengths W of 10 microvectors here after which, after the switching point P switching back to the first target depth normally takes place unless the next switching point P lies randomly at this time or after this length W. As can be seen specifically in FIG. 5, path lengths W with the second target depth apparently occur with very different lengths. This can be attributed to the fact that a plurality of equal-length elementary path lengths W can occur directly after one another in a randomly controlled manner.

Figure 6:
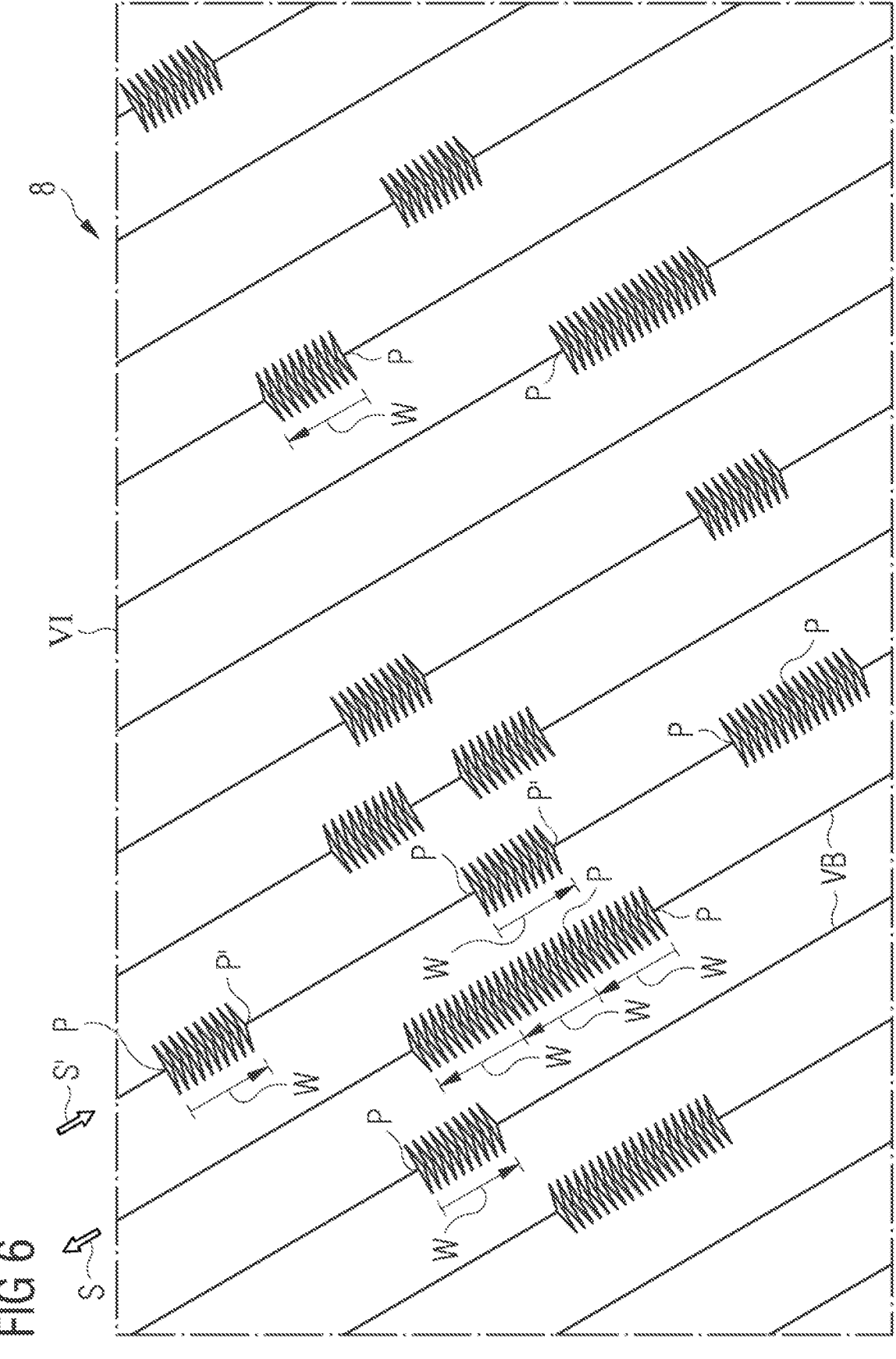
FIG. 6 shows an enlarged section of the partial region of the construction field shown in FIG. 5.

FIG. 6 shows another enlarged section V1 of the construction field 6 from FIG. 6. Here it can be clearly identified that the path lengths W always have the same length but in a randomly controlled manner, a plurality of elementary path lengths W can adjoin one another if a second elementary path length directly adjoins the end of a first elementary path length W. If, for example, at a point P' a processing ends with an increased target depth, a switching point P can again follow on directly so that randomly here operation continues with the increased random target depth. In this way obstacles extending over a plurality of path lengths W can form.

The sections or path lengths W along the hatch with the second target depth can form effective obstacles for the propagation of cracks, as described above, since the layers mesh well with one another.

Figure 7:
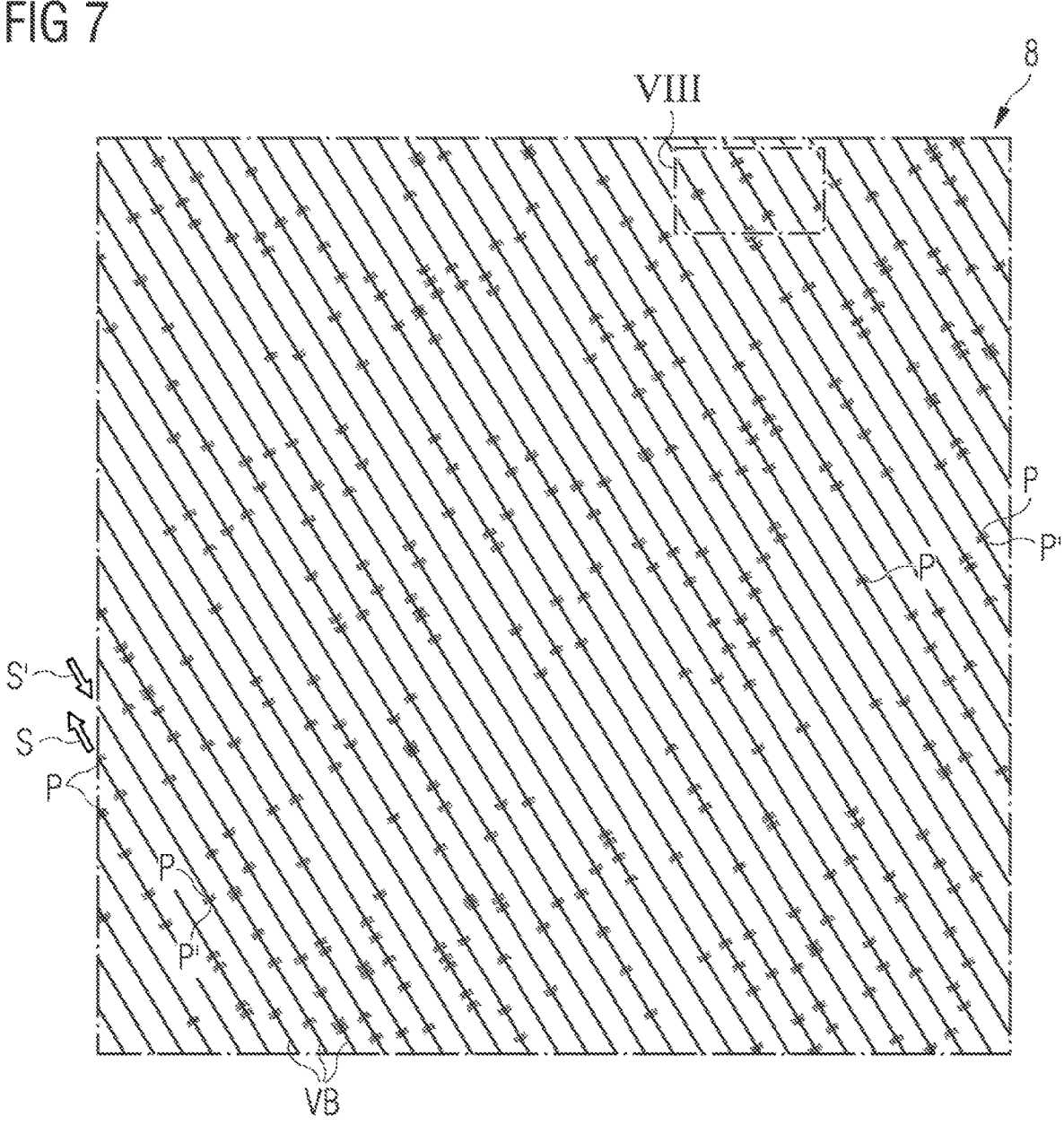
FIG. 7 shows a schematic diagram of solidification paths as in FIG. 5 but now according to a second exemplary embodiment.

In order to show the effect of the intensity I on the density of the switching points P, for comparison reference is made to FIG. 7 which, similarly to FIG. 5, shows a schematic view of a section of a construction field 8 with solidification paths VB in the form of hatches VB. Here also the switching points P at which a switching takes place from the first target depth to the deeper second target depth are randomly distributed on the hatches VB. A Poisson distribution was selected as the distribution function as in the exemplar embodiment according to FIG. 5, wherein in the example according to FIG. 5 an intensity of 1500 was predefined and in the example according to FIG. 7 an intensity of 2500, i.e. the switching points P lies closer in the variant according to FIG. 7.

Figure 8:
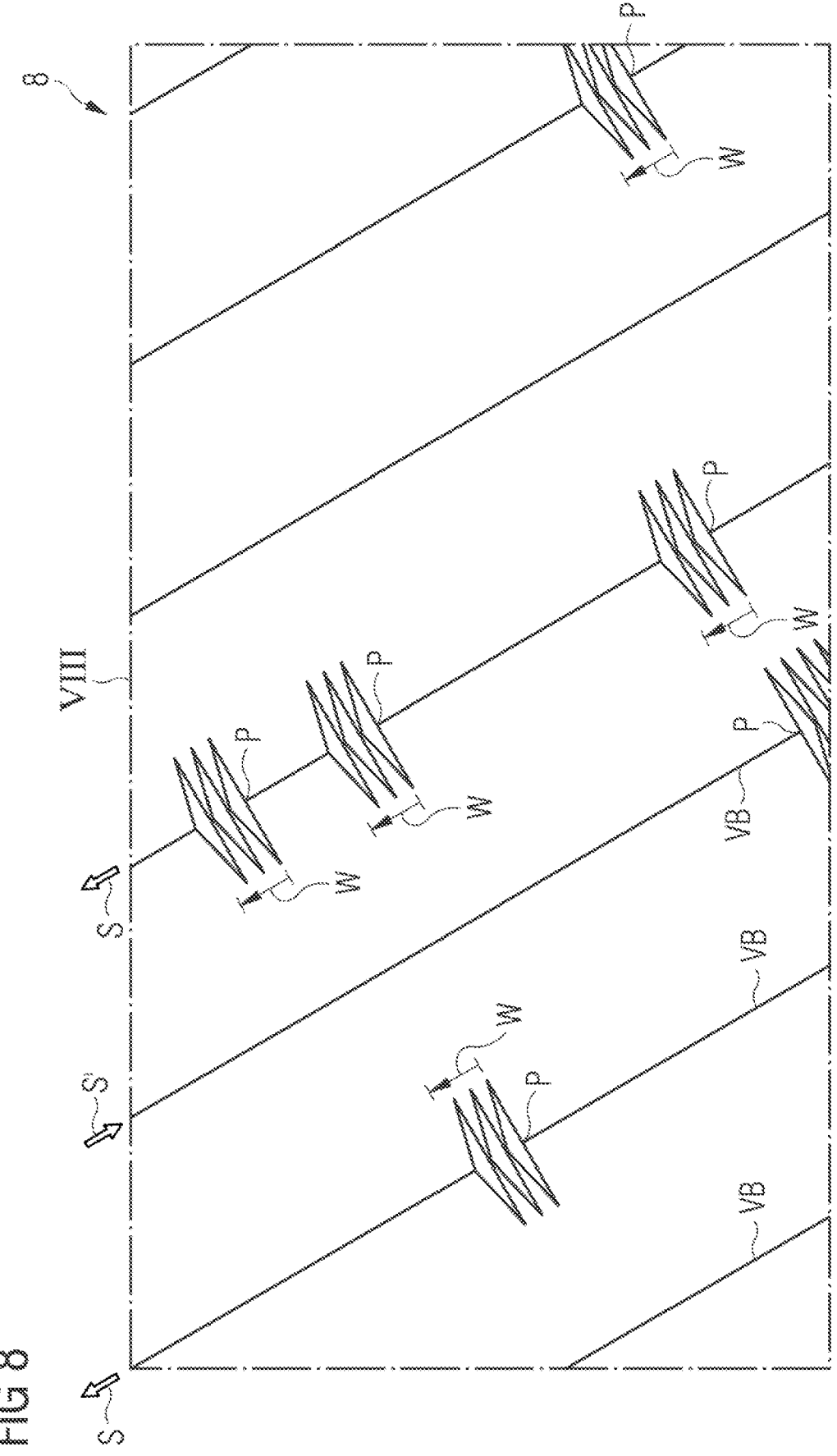
FIG. 8 shows an enlarged section of the partial region of the construction field shown in FIG. 7.

In the exemplary embodiment shown in FIG. 7, the path length W after which switching back from the second target depth to the first target depth normally takes place is reduced to only three microvectors, i.e. the obstacles for crack formation are more frequent than in FIG. 5 but shorter. FIG. 8 shows for this purpose an enlarged section VIII of a partial region of the construction field 8 shown in FIG. 7. In the section VII it can be seen that the path lengths W with increased solidification depth only each comprise three microvectors but can also directly follow one another.

Figure 9:
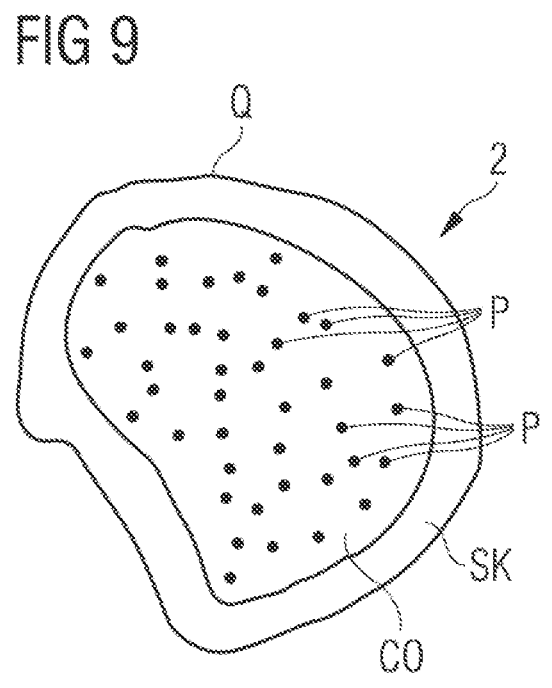

Finally, FIG. 9 shows a plan view of a cross-section Q of a component 2 with an inner region CO (core) and an outer region SK (skin). In the inner region CO a plurality of randomly generated switching points P are shown as black points. It should be noted that the points P are only shown symbolically here and in reality would lie much closer together. In the outer region SK on the other hand, there are no switching points P. This distribution of the obstacles only in the inner region forms the basis of the observation that obstacles in an edge region can cause a deterioration in the properties of the surface. In addition, in this arrangement of switching points, cracks which occur relatively far outwards could be specifically guided to the surface in order to make then visible there and thereby make defects more easily identifiable.

Finally, it should be noted once again that the devices described previously in detail are merely exemplary embodiments which can be modified by the person skilled in the art in various ways without departing from the invention. For example, a solidification could also take place using different energy beams instead of with laser light. Furthermore, the use of the indefinite article "a" or "an" does not exclude the fact that the relevant features can also occur multiple times. Likewise, the term "unit" does not exclude the fact that this consists of a plurality of cooperating partial components which can optionally be spatially distributed.

REFERENCE LIST

1 Additive manufacturing device/laser sintering device
2 Component/object
3 Process space/process chamber
4 Chamber wall
5 Container
6 Container wall
7 Working plane
8 Construction field 10 Support
11 Base plate
12 Building platform
13 Construction material (in container 5)
14 Storage container
15 Construction material (in storage container 14)
16 Coater
17 Radiation heater
18 Sensor arrangement/camera
20 Irradiation device/exposure device
21 Laser
22 Impact surface (of laser beam)
23 Deflecting device/Scanner
24 Focusing device
25 Coupling-in window
30 Beam forming device
50 Control device
51 Control unit
52 Quality data determining device
53 Irradiation control interface
54, 54' Control data generating device
55 Bus
56 Terminal
110 First diagram
120 Second diagram
AL (Output) energy beam/laser beam
BSD Control data/exposure control data
CO Inner region/core
D Nozzle
DS Nozzle control data
EL Input energy beam/laser beam
FS Focus control data
FS1, FS2 Part form control signals
H Horizontal direction
HS Heating control data
K Switching map/welding-depth-map
LS Laser control data
ON Nominal surface
P, P' Switching point
PSD Process control data
Q Cross-section
QD Quality data
S, S' Scanning direction/movement direction of impact
  surface
SB Process chamber sensor data set/layer image
SD Scan control data
SK Outer region/shell
ST Coating control data
SVF Target distribution
T Tolerance range
TI Actual welding penetration depth
TS Target welding penetration depth
TSD Support control data
TS1, TS1", TS1'" First target welding penetration depth/
  first target depth
TS2, TS2", TS2'" Second target welding penetration
  depth/second target depth
TT Fluctuation width
V Vertical direction
V1**, V1*, V1'", V1", V1', V1 Microvectors
V2, V2", V2'" Microvectors
VF Test function
VSD Intensity distribution control data
VS Vector trace
W Path length/distance
Z Switching time

The invention claimed is:

1. A method for generating control data for a device for additively manufacturing a component in a manufacturing process, in which method powdery construction material is built up in layers in a construction field, and in each case a selective solidification of construction material takes place between application of layers of construction material whereby the construction material is exposed to at least one energy beam, wherein the method comprises:

causing the energy beam to be moved along solidification paths across the construction field at least temporarily in an interlocking mode; and switching, in the interlocking mode, a location-dependent target welding penetration depth of the energy beam at a plurality of switching points which are randomly distributed over at least one defined region of a cross-section of the component in the respective layer using a predefined probability distribution, wherein, the switching is intentional and extends over a plurality of layers.

2. The method according to claim 1, further comprising varying at least one of the following parameters at at least one of the switching points:

an energy beam power;

an intensity distribution in the energy beam, a focus setting, a scan speed, a local supply of a gas or a gas mixture to the construction field.

3. The method according to claim 1, wherein at one of the switching points a switching is made between two different defined location-dependent target welding penetration depths, and/or wherein at one of the switching points a new location-dependent target welding penetration depth is selected depending on a random number.

4. The method according to claim 1, further comprising:

wherein, after switching from a first location-dependent target welding penetration depth to a second location-dependent target welding penetration depth at a switching point along the solidification path, the method further comprises switching back to the first location-dependent target welding penetration depth or switching to another location-dependent target welding penetration depth after a defined time interval, and/or after a defined additional path distance, and/or at a subsequent switching point along the path distance; and wherein an average switching frequency of the welding penetration depth is greater than a frequency of unintentional welding penetration depth fluctuations expected during the manufacturing process.

5. The method according to claim 1, further comprising selecting a depth distance between a second location-dependent target welding penetration depth and a first location-dependent target welding penetration depth independently of the first location-dependent target welding penetration depth at least in some regions.

6. The method according to claim 1, wherein a depth difference between a first location-dependent target welding penetration depth and a second location-dependent target welding penetration depth is at least a value of a nominal layer thickness, wherein at least one location-dependent target welding penetration depth extends over five times a nominal layer thickness and at least one location-dependent target welding penetration depth extends over at least seven times a nominal layer thickness.

7. The method according to claim 1, further comprising increasing or reducing a density of the interlocking points in the interlocking mode in predetermined working areas of the component or deactivating the interlocking mode.

8. The method according to claim 1, further comprising controlling the device for additive manufacture so that a heat conduction welding process and a deep welding process is used at least temporarily; and temporarily switching from a heat conduction welding process to a deep welding process; and/or temporarily superimposing a heat conduction welding path with a deep welding path.

9. The method according to claim 1, further comprising specifying a welding-depth-map for each material layer, the welding-depth-map comprising at least the switching points and at the location within a cross-section of the component in the respective layer on the construction field which location-dependent target welding penetration depth should be set during irradiation of the relevant material layer.

10. The method according to claim 9, further comprising:

checking a distribution of the switching points in the welding-depth-map with regard to a quality criterion; and specifying a new or amended welding-depth-map when the quality criterion is not satisfied.

11. A non-transitory computer-readable storage medium storing instructions that perform the steps of the method according to claim 1, when the instructions are executed by a control data generating device and/or a control device.

12. A method for additive manufacture of a component, wherein powdery construction material comprising a metal powder is built up in layers in a construction field and in each case a selective solidification of construction material takes place between the application of layers of construction material whereby the construction material is irradiated by at least one energy beam, the method comprising:

moving the energy beam along a plurality of solidification paths across the construction field at least temporarily in an interlocking mode; and changing, in the interlocking mode, a location-dependent target welding penetration depth of the energy beam at a plurality of switching points which are randomly distributed using a predefined probability distribution over at least one defined region of a cross-section of the component in the respective layer, wherein, the changing is intentional and extends over a plurality of layers.

13. A control data generating device for generating control data for a device for additively manufacturing a component in a manufacturing process in which powdery construction material is built up in layers in a construction field and in each case a selective solidification of layers of construction material takes place between the application of the layers of construction material whereby the construction material is exposed to at least one energy beam, the control data generating device including or creating instructions that, when executed by a processor, perform the following:

moving the energy beam along a plurality of solidification paths across the construction field at least temporarily in an interlocking mode; and changing, in the interlocking mode, a location-dependent target welding penetration depth of the energy beam at a plurality of switching points which are randomly distributed over at least a defined region of a cross-section of the component in the respective layer using a predefined probability distribution, wherein, the changing is intentional and extends over a plurality of layers.

14. A control device for a device for additive manufacture of a component in a manufacturing process in which construction material is built up in layers in a construction field and in each case a selective solidification of layers of construction material takes place between the application of layers of construction material whereby the construction material is exposed to at least one energy beam by means of an irradiation device, wherein the control device comprises a control data generating device according to claim 13.

15. A device for additive manufacture of at least one component in an additive manufacturing process comprising:

a feed device for applying material layers of construction material in a construction field in a process chamber;

an irradiation device for selectively solidifying construction material between the application of layers by irradiation with at least one energy beam; and a control device according to claim 14.

* * * * *